United States Patent
Kamiyama et al.

(10) Patent No.: US 10,459,539 B2
(45) Date of Patent: Oct. 29, 2019

(54) ELECTRONIC PEN AND ELECTRONIC PEN MAIN BODY

(71) Applicant: Wacom Co., Ltd., Saitama (JP)

(72) Inventors: Ryoji Kamiyama, Ibaraki (JP); Toshihiko Horie, Saitama (JP)

(73) Assignee: WACOM CO., LTD., Saitama (JP)

( * ) Notice: Subject to any disclaimer, the term of this patent is extended or adjusted under 35 U.S.C. 154(b) by 0 days.

(21) Appl. No.: 15/688,135

(22) Filed: Aug. 28, 2017

(65) Prior Publication Data

US 2017/0357340 A1 Dec. 14, 2017

Related U.S. Application Data

(63) Continuation of application No. PCT/JP2016/055126, filed on Feb. 23, 2016.

(30) Foreign Application Priority Data

Mar. 6, 2015 (JP) .................. 2015-044397

(51) Int. Cl.
| | | |
|---|---|---|
| *G06F 3/033* | (2013.01) | |
| *G06F 3/0354* | (2013.01) | |
| *G06F 3/044* | (2006.01) | |
| *G06F 3/046* | (2006.01) | |

(52) U.S. Cl.
CPC .......... *G06F 3/03545* (2013.01); *G06F 3/044* (2013.01); *G06F 3/046* (2013.01)

(58) Field of Classification Search
CPC .................................................. G06F 3/03545
See application file for complete search history.

(56) References Cited

U.S. PATENT DOCUMENTS

| | | | |
|---|---|---|---|
| 8,304,671 B2 | 11/2012 | Fukushima et al. | |
| 8,913,041 B2 | 12/2014 | Fukushima et al. | |
| 9,063,025 B2 | 6/2015 | Horie et al. | |
| 9,151,586 B2 | 10/2015 | Fukushima et al. | |
| 2005/0156915 A1* | 7/2005 | Fisher | G06F 3/0317 345/179 |
| 2012/0223917 A1* | 9/2012 | Lin | G06F 3/03545 345/179 |

(Continued)

FOREIGN PATENT DOCUMENTS

| | | |
|---|---|---|
| EP | 0 772 149 A1 | 5/1997 |
| JP | 7-41629 U | 7/1995 |

(Continued)

*Primary Examiner* — Roy P Rabindranath
(74) *Attorney, Agent, or Firm* — Seed IP Law Group LLP

(57) ABSTRACT

An electronic pen has a tubular housing which has an opening provided at one end in an axial direction of the housing and is closed at another end thereof, and has at least one electronic pen main body accommodated in the tubular housing. The electronic pen main body includes a core body having an end in the axial direction of the housing that serves as a pen tip, and a magnetic core provided at an end of core body that is opposite to the end of the core body that serves as the pen tip and having a coil wound thereon. In operation, the end of the core body that serves as the pen tip projects from the opening of the housing to outside of the housing, and part of the magnetic core projects from the opening of the housing to outside of the housing.

16 Claims, 11 Drawing Sheets

(56) References Cited

U.S. PATENT DOCUMENTS

| | | | | |
|---|---|---|---|---|
| 2012/0256830 A1* | 10/2012 | Oda | ............... | G06F 3/03545 345/157 |
| 2014/0015810 A1* | 1/2014 | Chau | ............... | G06F 3/03545 345/179 |
| 2015/0212601 A1* | 7/2015 | Zerayohannes | ..... | G06F 3/03545 345/179 |

FOREIGN PATENT DOCUMENTS

| | | |
|---|---|---|
| JP | 9-128131 A | 5/1997 |
| JP | 2009-86925 A | 4/2009 |
| JP | 2010-55385 A | 3/2010 |
| JP | 2011-186803 A | 9/2011 |
| JP | 2013-161307 A | 8/2013 |
| JP | 2013-222268 A | 10/2013 |

\* cited by examiner

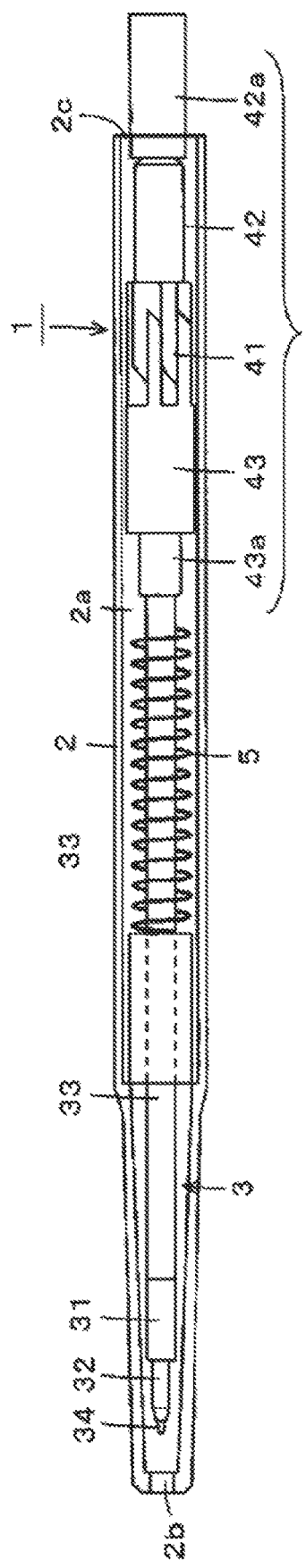
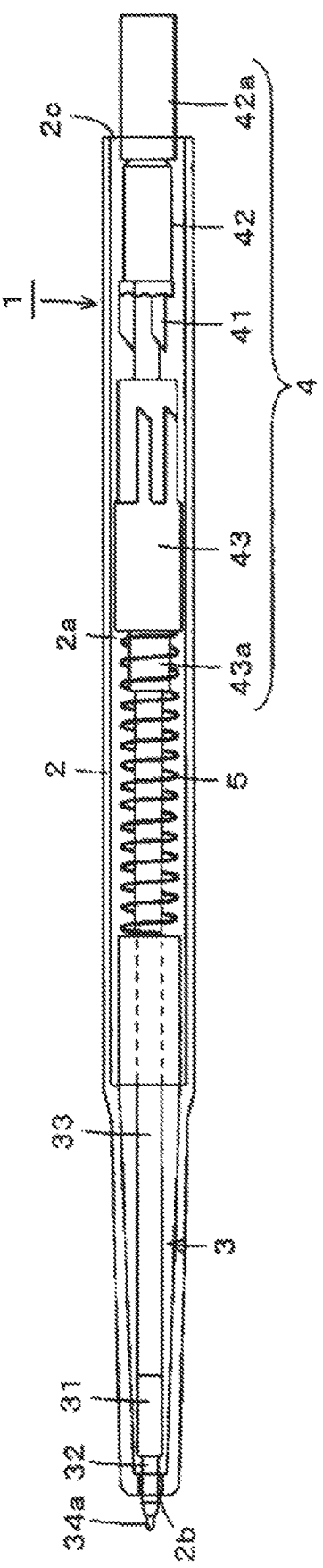
FIG. 1A
FIG. 1B

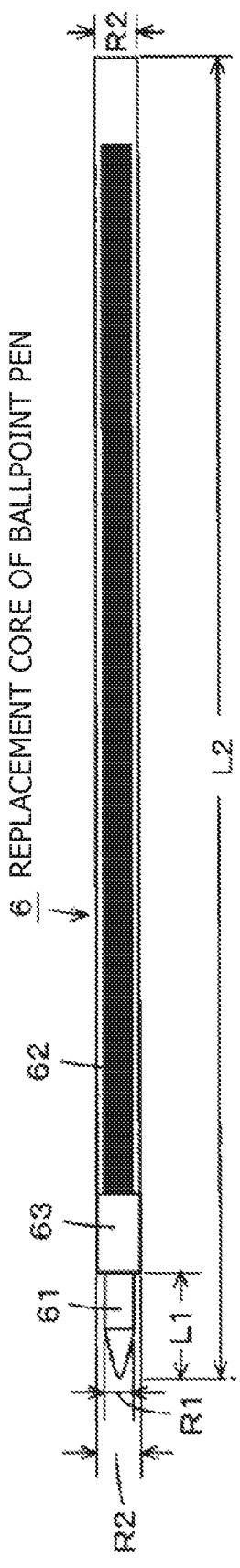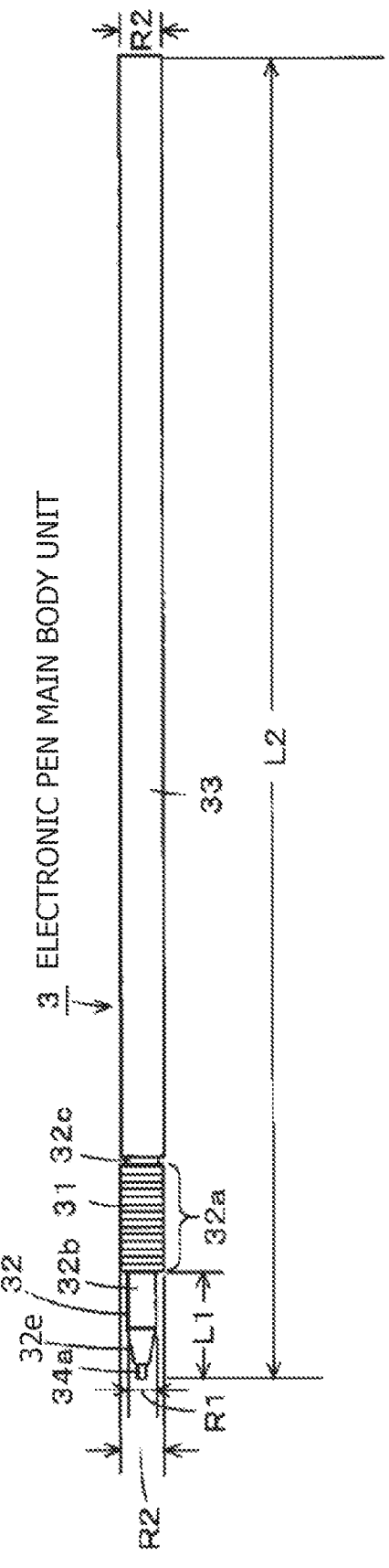

ELECTRONIC PEN AND ELECTRONIC PEN MAIN BODY

TECHNICAL FIELD

The present disclosure relates to an electronic pen for use with a position detection device and an electronic pen main body used in the electronic pen.

DESCRIPTION OF RELATED ART

In recent years, as an inputting apparatus for various types of electronic equipment, a coordinate inputting apparatus has been and is being used, and opportunities to use an electronic pen as an inputting tool for the coordinate inputting apparatus are increasing. As the coordinate inputting apparatus, an apparatus of an electromagnetic induction type is used mainly, and as an apparatus of the electromagnetic induction type, an apparatus of a type is available in which a magnetic field from a sensor is received by a resonance circuit provided in an electronic pen and is fed back to the sensor.

A coordinate inputting apparatus of the electromagnetic induction type just described is configured from a position detection device including a sensor which includes a large number of loop coils disposed in an X-axis direction and a Y-axis direction of coordinate axes, and an electronic pen as a pen-shaped position indicator having a resonance circuit configured from a coil as an example of an inductance element wound around a magnetic core and a capacitor.

The position detection device supplies a transmission signal of a predetermined frequency to the loop coils of the sensor such that the transmission signal is transmitted as electromagnetic energy to the electronic pen. The resonance circuit of the electronic pen is configured such that it has a resonance frequency according to the frequency of the transmission signal and stores the electromagnetic energy on the basis of an electromagnetic induction action with the loop coils of the sensor. Then, the electronic pen feeds back the electromagnetic energy stored in the resonance circuit to the loop coils of the sensor of the position detection device.

Each loop coil of the sensor detects the electromagnetic energy from the electronic pen. The position detection device detects coordinate values in the X-axis direction and the Y-axis direction of the position on the sensor indicated by the electronic pen on the basis of the position of the loop coil from which a transmission signal is supplied and the position of a loop coil which detects the electromagnetic energy from the resonance circuit of the electronic pen.

FIG. 12 depicts an example of a general configuration of a conventional electronic pen 100. The electronic pen 100 of the example of FIG. 12 is disclosed in Patent Document 1 (Japanese Patent Laid-Open No. 2009-86925).

A case (housing) 101 of the electronic pen 100 disclosed in Patent Document 1 has a bottomed cylindrical shape configured from a first case 102 and a second case 103 assembled and coupled to each other in an axial direction. At one end of the first case 102 in the axial direction, an opening 102a for allowing a bar-shaped core body 109, having a first end 109a that serves as a pen tip, to project, at the one end 109a side thereof, to the outside therethrough is formed. In a hollow portion of the case 101, a coil 104, a writing pressure detector 105, and a printed circuit board 107 on which electronic parts such as a capacitor 106 which cooperates with the coil 104 to configure a resonance circuit are mounted are accommodated in a successively juxtaposed relationship with each other in the axial direction.

The coil 104 is wound around a ferrite core 108 as an example of a cylindrical magnetic core having a through-hole 108a extending in the axial direction. The core body 109 is configured such that it is not mechanically coupled to the ferrite core 108 and is provided so as to extend through the through-hole 108a of the ferrite core 108. Further, the writing pressure detector 105 is accommodated at an end of the ferrite core 108 that is opposite the opening 102a of the first case 102, and a second end 109b of the core body 109 is fitted in the writing pressure detector 105. The core body 109 is displaced in the axis direction in response to a writing pressure applied thereto. The writing pressure detector 105 in the present example has a configuration of a capacitor whose capacitance varies in response to the displacement occurring with the core body 109 and is configured such that it detects a writing pressure as a variation of the capacitance of the capacitor.

The writing pressure detector 105 is electrically connected to electronic parts such as a capacitor on the printed circuit board 107 through a terminal 105a and another terminal 105b and is electrically connected to one end and the other end of the coil 104. The capacitor configuring the writing pressure detector 105 cooperates with a coil and a predetermined capacitor to configure a resonance circuit. If a pressure (writing pressure) is applied to the core body 109, then the capacitance of the capacitor configuring the writing pressure detector 105 varies, whereupon the resonance frequency of the resonance circuit varies. The electronic pen 100 performs sending and receiving of an electromagnetic wave to and from the sensor of the position detection device through the resonance circuit. The position detection device detects an indication position by the core body 109 of the electronic pen 100 as a coordinate position at which sending and receiving of an electronic wave are performed to and from the electronic pen 100, and detects a writing pressure applied to the electronic pen from a frequency (resonance frequency) of a signal fed back from the electronic pen 100.

In this manner, the conventional electronic pen of the electromagnetic induction type is configured such that the core body 109 is disposed through the through-hole 108a extending in the axial direction of the ferrite core 108 such that a pressure applied to the core body 109 is transmitted to the writing pressure detector 105 thereby to allow detection of touch of the electronic pen 100 with an inputting face of the sensor of the position detection device.

PRIOR ART DOCUMENT PATENT DOCUMENT

Patent Document 1: Japanese Patent Laid-Open No. 2009-86925

BRIEF SUMMARY

Technical Problem

Incidentally, depending on the taste of miniaturization in recent years, a requirement for further miniaturization also of electronic equipment of the portable type is increasing. Thus, an electronic pen comes to be used together with a position detection device for small-sized electronic equipment of the type just described, and a thinner electronic pen is demanded.

In an electronic pen of the electromagnetic induction type described above, it is important to capture magnetic fluxes from a sensor with certainty and feed the magnet fluxes back to the sensor with certainty. Therefore, conventionally the winding sectional area of a coil, namely, the sectional area of a ferrite core, is increased or the coil is wound in multilayers such that a greater number of magnetic fluxes can be exchanged between the electronic pen and the sensor, namely, the number of magnetic fluxes which link with the coil is increased.

However, if the thickness of an electronic pen is reduced, then also the thickness of the ferrite core is reduced and the winding thickness of the coil to be wound is restricted. Therefore, even if it is tried to wind the coil in multilayers, there is a limitation, and there is a problem that the number of magnetic fluxes to link decreases, resulting in decrease in magnetic coupling with the sensor.

It is an object of the present disclosure to provide an electronic pen and an electronic pen main body which can solve the problem described above.

Technical Solution

In order to solve the problem described above, an electronic pen main body of the present disclosure is accommodated in a tubular housing of an electronic pen such that at least a pen tip of the electronic pen is projectable from one opening in an axial direction of the tubular housing. The electronic pen main body includes a core body having an end in the axial direction of the housing that serves as the pen tip, and a magnetic core provided at an end of the core body that is opposite the end of the core body that serves as the pen tip and having a coil wound thereon. The magnetic core has a coil non-wound portion in the axial direction on which the coil is not wound, provided at least at the pen tip side thereof. When the electronic pen is used, the one end of the core body which is the pen tip projects from the opening of the housing to the outside, and part of the coil non-wound portion of the magnetic core projects from the opening to outside of the housing.

Meanwhile, the electronic pen of the present disclosure has a tubular housing which has an opening provided at one end in an axial direction of the tubular housing which is a pen tip side and is closed at another end thereof and in which at least one electronic pen main body is accommodated in the tubular housing. The electronic pen main body includes a core body having a first end in the axial direction of the tubular housing that serves as a pen tip, and a magnetic core provided at a second end of the core body that is opposite to the first end of core body that serves as the pen tip and having a coil wound thereon. In operation, the first end of the core body that serves as the pen tip projects from the opening of the housing to outside of the housing, and part of the magnetic core projects from the opening to outside of the housing.

In the electronic pen according to the present disclosure having the configuration described above, in operation, the first end of the core body that serves as the pen tip of the electronic pen man body projects from the opening of the housing to the outside, also part of the magnetic core projects from the opening to the outside.

Accordingly, the distance between the magnetic core and a sensor of a position detection device decreases, and magnetic coupling between the electronic pen main body and the sensor becomes stronger. Consequently, even if the thickness of the electronic pen is reduced, the strength of the magnetic coupling between the electronic pen and the sensor of the position detection device can be improved.

Advantageous Effect

According to the present disclosure, even if the thickness of the electronic pen is reduced, the strength of the magnetic coupling between the electronic pen and the sensor of the position detection device can be improved.

BRIEF DESCRIPTION OF THE DRAWINGS

FIGS. 1A and 1B show views depicting an example of a configuration of an electronic pen according to a first embodiment of the present disclosure.

FIGS. 2A and 2B show views illustrating an example of a configuration of an electronic pen main body according to the first embodiment of the present disclosure.

Figure 3A:
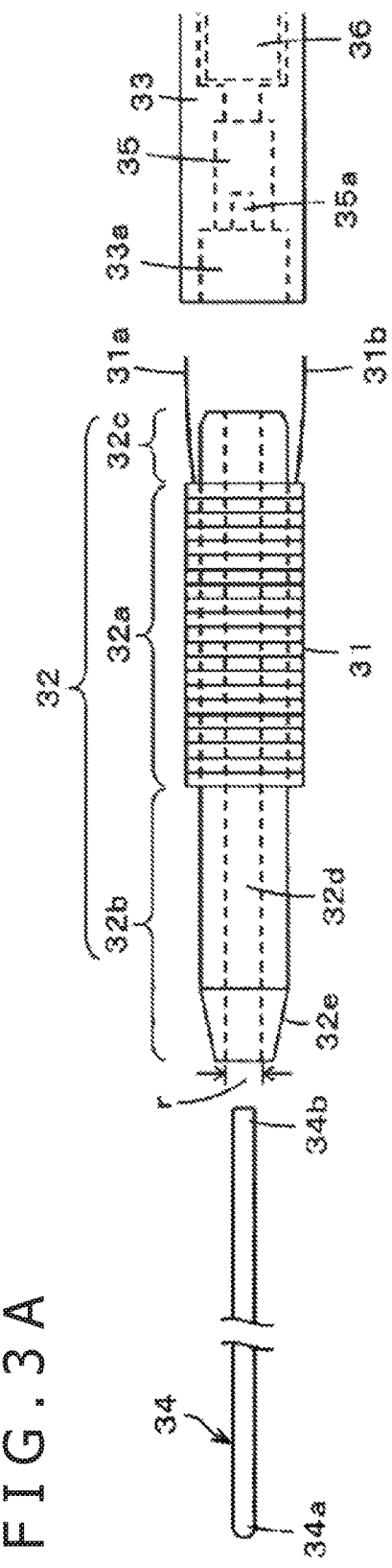
FIGS. 3A and 3B show views illustrating a configuration of part of an electronic pen main body according to the first embodiment of the present disclosure.

In the following, embodiments of the electronic pen and the electronic pen main body according to the present disclosure are described with reference to the drawings.

First Embodiment

FIGS. 1A and 1B show views depicting an example of a configuration of a first embodiment of the electronic pen according to the present disclosure. The electronic pen 1 of the present first embodiment has a knock type configuration in which an electronic pen main body 3 is accommodated in a hollow portion 2a of a tubular housing 2 and a pen tip side of the electronic pen main body 3 is moved out from and into an opening 2b side at one end of the housing 2 in its longitudinal direction by a knock cam mechanism 4. In the present embodiment, the electronic pen main body 3 has a configuration of a cartridge type and is removably mounted on the housing 2.

FIG. 1A illustrates a state in which the electronic pen main body is entirely accommodated in the hollow portion 2a of the housing 2, and FIG. 11B illustrates a state in which the pen tip side of the electronic pen main body is projected from the opening 2b of the housing 2 by the knock cam mechanism 4. It is to be noted that, in the example of FIGS. 1A and 1B, the housing 2 of the electronic pen 1 is configured from a transparent synthetic resin material such that the inside thereof can be seen through the housing 2.

The electronic pen 1 of the present embodiment is configured such that it has compatibility with a commercially available knock type ballpoint pen.

The housing 2 and the knock cam mechanism 4 provided in the housing 2 have a configuration that is the same as that of a well-known commercially available knock type ballpoint pen and also has a same configuration in dimensional relationship. In other words, also it is possible to use a housing and a knock cam mechanism of a commercially available knock type ballpoint pen as the housing 2 and the knock cam mechanism 4, respectively.

As depicted in FIGS. 1A and 1B, the knock cam mechanism 4 has a known configuration in which a cam main body 41, a knock bar 42, and a rotor 43 are combined. The cam main body 41 is formed on an inner wall face of the tubular housing 2. The knock bar 42 has an end portion 42a which projects from an opening 2c of the housing 2 at a side opposite the pen tip side such that it can accept a knock operation of a user. The rotor 43 has a fitting portion 43a with which an end portion of the electronic pen main body 3 at the side opposite the pen tip side is fitted.

If, in the state of FIG. 1A, the end portion 42a of the knock bar 42 is depressed, then the electronic pen main body 3 is locked to a state of FIG. 1B in the housing 2 by the knock cam mechanism 4 to establish a state in which the pen tip side of the electronic pen main body 3 projects from the opening 2b of the housing 2. Then, if the end portion 42a of the knock bar 42 is depressed again from the state of FIG. 1B, then the locked state is canceled by the knock cam mechanism 4 and the position of the electronic pen main body 3 in the housing 2 returns to the state of FIG. 1A by a return spring 5. Since a detailed configuration and operation of the knock cam mechanism 4 are known, description of them is omitted herein.

Embodiment of Electronic Pen Main Body 3

FIGS. 2A and 2B show views depicting an example of a configuration of the electronic pen main body 3 in comparison with a replacement core of a commercially available knock type ballpoint pen. In particular, FIG. 2A depicts a replacement core 6 of a commercially available knock type ballpoint pen, and FIG. 2B depicts an example of a configuration of the electronic pen main body 3 of the present embodiment.

The replacement core 6 of the commercially available knock type ballpoint pen has a known configuration in which a pen tip portion 61 having a ball disposed at a tip thereof and an ink accommodation portion 62 are coupled into a unitary member by a coupling portion 63 as depicted in FIG. 2A. The coupling portion 63 has a diameter equal to that of the ink accommodation portion 62.

Meanwhile, in the electronic pen main body 3 of the present embodiment, a magnetic core on which a coil 31 is wound, in the present example, a ferrite core 32, is coupled to a tubular body portion 33 as depicted in FIG. 2B. Further, a core body 34 is inserted in a through-hole (not depicted in FIGS. 2A and 2B) of the ferrite core 32 and fitted in a writing pressure detector (not depicted in FIGS. 2A and 2B) provided in the tubular body portion 33 such that it is provided as part of the electronic pen main body 3 as hereinafter described. As depicted in FIGS. 2A and 2B, the core body 34 projects at the one end portion 34a (hereinafter referred to as tip end portion 34a) as a pen tip from the ferrite core 32.

Figure 3B:
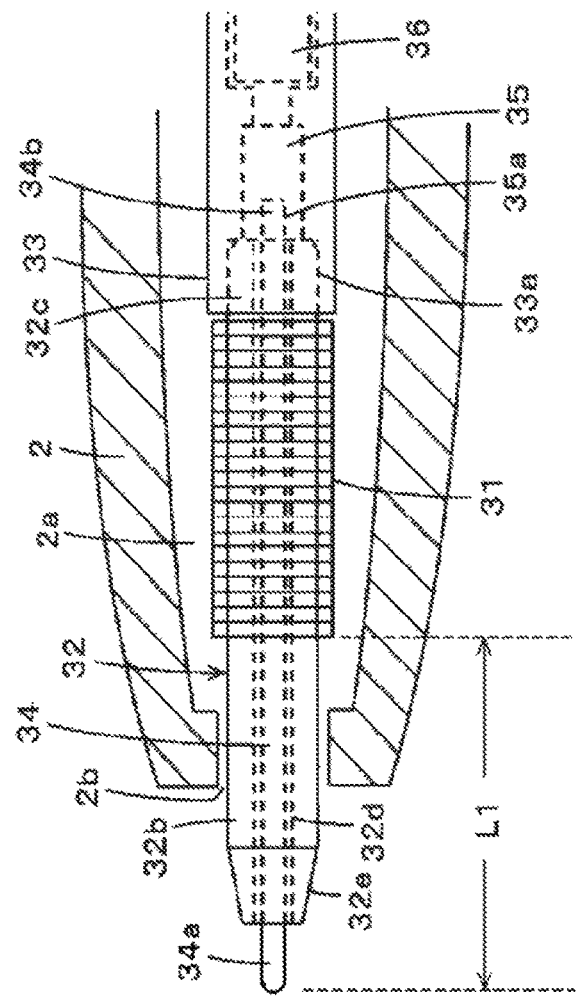

FIG. 3B is an exploded enlarged view of the ferrite core 32 on which the coil 31 is wound, part of the tubular body portion 33, and a portion of the core body 34. The ferrite core 32 of the present example is configured such that a through-hole 32d extending in an axial direction of ferrite core 32 and having a predetermined diameter r (for example, r=1 mm), into which the core body 34 is to be inserted, for example, in a ferrite material of a cylindrical shape. A tapered portion 32e having a gradually tapered shape is formed at the pen tip side of the ferrite core 32. By the tapered portion 32e, magnetic fluxes passing the ferrite core 32 have an increased concentration at the tapered portion 32e, by which magnetic coupling with a sensor of a position detection device can be increased in comparison with that in an alternative case in which the tapered portion 32e is not provided.

Further, in the present embodiment, as depicted in FIG. 3B, the coil 31 is wound not over an overall length of the ferrite core 32 in the axial direction but over part of the length. In particular, in the present example, the coil 31 has a winding length equal to approximately one half the overall length of the ferrite core 32, and as depicted in FIG. 3B, a wound portion 32a of the coil on the ferrite core 32 is provided at a position of the ferrite core 32 displaced to a coupling portion side to the tubular body portion 33.

Further, when the ferrite core 32 is viewed in the axial direction thereof, a portion thereof from an end portion at the pen tip side to one end of the coil wound portion 32a is a first coil non-wound portion 32b on which the coil is not wound, and also some portion of the ferrite core 32 from the other end of the coil wound portion 32a to the coupling portion side of the ferrite core 32 to the tubular body portion 33 is a second coil non-wound portion 32c on which the coil 31 is not wound. The length of the second coil non-wound portion 32c in the axial direction is a small length for coupling to the tubular body portion 33. On the other hand, the length of the first coil non-wound portion 32b in the axial direction is, in the present example, a comparatively great length which is the difference when the length of the second coil non-wound portion 32c is subtracted from approximately one half the overall length of the ferrite core 32.

Further, in the present embodiment, a writing pressure detector 35 is provided in the proximity of the coupling portion of the tubular body portion 33 to the ferrite core 32. As the writing pressure detector 35, in the present example, writing pressure detection means of a known configuration disclosed, for example, in a Patent Document: Japanese Patent Laid-Open No. 2011-186803 is used. It is to be noted that the writing pressure detector 35 can be configured also by using such a semiconductor element whose capacitance varies in response to a writing pressure as disclosed, for example, in Japanese Patent Laid-Open No. 2013-161307.

In the tubular body portion 33, a printed circuit board 36 is accommodated further. A capacitor which is connected in parallel to the coil 31 to configure a resonance circuit is provided on the printed circuit board 36. The variable capacitor configured from the writing pressure detector 35 is connected in parallel to a capacitor formed on the printed circuit board 36 to configure part of the resonance circuit (refer to FIG. 4 hereinafter described).

Further, as depicted in FIG. 3B, the second coil non-wound portion 32c of the ferrite core 32 is entirely or partly fitted in a recessed portion 33a provided on the tubular body portion 33 to couple the ferrite core 32 to the tubular body portion 33. Though not depicted, upon such coupling of the ferrite core 32 to the tubular body portion 33, one ends 31a and 31b of the coil 31 are electrically connected such that the coil 31 is connected in parallel to the capacitor provided on the printed circuit board 36 of the tubular body portion 33.

Since the diameter of the coil wound portion 32a of the ferrite core 32 and the diameter of the tubular body portion 33 are equally set to a diameter R2 as depicted in FIGS. 2A and 2B, when the second coil non-wound portion 32c of the ferrite core 32 and the recessed portion 33a of the tubular body portion 33 are fitted with each other as depicted in FIG. 3B, the coil 31 and the tubular body portion 33 are connected to each other without forming a step therebetween. Consequently, the electronic pen main body 3 has an appearance shape substantially the same as an appearance shape of the replacement core 6 of a ballpoint pen.

The core body 34 is configured from a nonconductive bar-like member having a diameter smaller than the diameter r of the through-hole of the ferrite core 32 as depicted in FIG. 3B. In the present example, the core body 34 is formed from a comparatively hard resin material having elasticity, for example, from polyoxymethylene (POM).

In a state in which the ferrite core 32 and the tubular body portion 33 are coupled to each other, the core body 34 is inserted from the side at which the tapered portion 32e is formed into the through-hole 32d of the ferrite core 32 as depicted in FIG. 3B. Then, the core body 34 is fitted, at an end portion 34b thereof at the side opposite to the tip end portion 34a, into a fitting portion 35a of the writing pressure detector 35 in the tubular body portion 33. In this case, though not particularly depicted, an elastic material such as, for example, elastic rubber is disposed at the fitting portion 35a of the writing pressure detector 35, and the end portion 34b of the core body 34 is held by the elastic material such that the core body 34 does not come out readily. However, if a user applies force so as to pull out the core body 34, then the fitting between the core body 34 and the fitting portion 35a of the writing pressure detector 35 is cancelled readily, and the core body 34 can be pulled out. In other words, the core body 34 is exchangeable.

In the case of the present example, as depicted in FIG. FIG. 2A and FIG. 2B, the dimension of the electronic pen main body 3 at the pen tip side is configured so as to be substantially equal to the dimension of the replacement core 6 of the ballpoint pen at the pen tip side. In particular, the diameter of the ferrite core 32 provided at the pen tip side of the electronic pen main body 3 is configured so as to be substantially equal to a diameter R1 of the pen tip portion 61 of the replacement core 6 of the ballpoint pen. Further, the total length of the length of the portion of the tip end portion 34a of the core body 34 projecting from the ferrite core 32 and the length of the first coil non-wound portion 32b of the ferrite core 32 is configured so as to be substantially equal to a length L1 of the pen tip portion 61 of the replacement core 6 of the ballpoint pen as depicted in FIGS. 2A, 2B, and 3B.

Further, the diameter of the coil wound portion 32a of the ferrite core 32 on which the coil 31 is wound and the diameter of the tubular body portion 33 of the electronic pen main body 3 are substantially equal to the diameter R2 of the ink accommodation portion 62 of the replacement core 6 of the ballpoint pen and is greater than the diameter R1 of the pen tip portion 61 (R2>R1). It is to be noted that the diameter of the opening 2b of the housing 2 is smaller than the diameter R2. Accordingly, the coil wound portion 32a cannot project outwardly from the opening 2b.

Further, as depicted in FIGS. FIGS. 2A and 2B, the length (overall length) of the electronic pen main body 3 in a state in which the ferrite core 32 and the tubular body portion 33 are coupled to each other and the core body 34 is fitted with the writing pressure detector 35 in the tubular body portion 33 through the through-hole of the ferrite core 32 is selected equal to an overall length L2 of the replacement core 6 of the ballpoint pen.

The electronic pen main body 3 of such a configuration as described above can be accommodated into the housing 2 by fitting the tubular body portion 33 of the electronic pen main body 3 with the fitting portion 43a of the rotor 43 of the knock cam mechanism 4. Further, in the electronic pen 1 of the present embodiment, when a user uses the electronic pen 1 together with a position detection device, the user would depress the end portion 42a of the knock bar 42. Consequently, the electronic pen 1 is placed into a state in which the tip end portion 34a of the core body 34 and part of the first coil non-wound portion 32b of the ferrite core 32 project from the opening 2b of the housing 2 as depicted in FIGS. 1B and 3B. In this state, the user of the electronic pen 1 could perform an inputting operation of an indication position on the sensor of the position detection device.

After the use of the electronic pen 1 ends, the electronic pen main body 3 can be placed into a state in which it is entirely accommodated in the hollow portion 2a of the housing 2 as depicted in FIG. 1A by depressing the end portion 42a of the knock bar 42 again. At this time, the entire electronic pen main body 3 is accommodated in the hollow portion 2a of the housing 2 to place the tip end portion 34a of the core body 34 of the electronic pen main body 3 into a state in which it is protected by the housing 2.

Effects of First Embodiment

In the electronic pen 1 of the present embodiment, when the electronic pen 1 is used where the tip end portion 34a of the core body 34 projects to outside of the housing 2, not only the core body 34 but also part of the first coil non-wound portion 32b of the ferrite core 32 project from the opening 2b of the housing 2, and the distance from the tip of the tapered portion 32e of the ferrite core 32 to the inputting face of the sensor is reduced. Accordingly, with the electronic pen 1 of the present embodiment, electromagnetic coupling with the sensor is strong in comparison with that of a conventional electronic pen in which the ferrite core 32 stays within the hollow portion 2a of the housing 2. Further, in the present embodiment, since the ferrite core 32 at the tip end portion 34a side of the core body 34 is formed as the tapered portion 32e, the cross-sectional area of the tip of the ferrite core 32 is reduced, and this increases the magnetic flux density to electromagnetically couple the ferrite core 32 stronger to the sensor.

Accordingly, even if the electronic pen 1 of the present embodiment is reduced in thickness, it can be electromagnetically coupled strongly to the sensor, and the position detection device can detect the indication position by the electronic pen with a high sensitivity.

In this case, as the thickness of the electronic pen 1 decreases, also the core body 34 becomes much thinner, and this makes the strength matter. Especially, where the ferrite core exists in the hollow portion 2a of the housing 2 also when the tip end portion 34a of the core body 34 projects to outside of the housing 2 from the opening 2b, the length of the core body 34 at the tip end portion 34a side over which the core body 34 projects from the end portion of the through-hole becomes great, and there is the possibility that the core body 34 may be broken.

In contrast, the present embodiment is configured such that, when the tip end portion 34a of the core body 34 projects to the outside of the housing 2 from the opening 2b of the housing 2, also part of the first coil non-wound portion 32b of the ferrite core 32 projects to the outside of the housing 2 from the opening 2b of the housing 2, and the length over which the tip end portion 34a side of the core body 34 projects from the end portion of the through-hole of the ferrite core 32 may be a minimum length as a pen tip. In other words, the electronic pen main body 3 of the present embodiment is inserted in the through-hole 32d of and protected by the ferrite core 32 except the tip end portion 34a of a minimum required length to be projected to the outside. Accordingly, the electronic pen 1 and the electronic pen main body 3 of the present embodiment exhibit an effect that, even if the core body 34 becomes thinner, breakage thereof can be prevented.

Further, since reduction in thickness of the electronic pen main body 3 can be implemented, the electronic pen main body 3 can be configured such that it has compatibility with a replacement core of a commercially available ballpoint pen.

Where the electronic pen main body 3 is configured so as to have compatibility with the replacement core of a commercially available ballpoint pen, there is a merit that the housing of a commercially available ballpoint pen can be diverted as the housing 2 of the electronic pen 1. In other words, the electronic pen 1 can be configured by accommodating the electronic pen main body 3 of the present embodiment into the housing of the ballpoint pen in place of the replacement core of a ballpoint pen.

It is to be noted that, while, in the example of FIGS. 2A and 2B, the coil 31 is wound on a portion of substantially one half-length that of the ferrite core 32, the length of the portion of the ferrite core 32 on which the coil 31 is to be wound is not limited to this but is arbitrary. Further, the total length of the tip end portion 34a of the core body 34 and the first coil non-wound portion 32b of the ferrite core 32 is not limited, where compatibility with the replacement core of a commercially available ballpoint pen is to be secured, to the length L1 described above but may be equal to or greater than the length L1.

<Circuit Configuration for Position Detection and Writing Pressure Detection in Position Detection Device Used Together with Electronic Pen 1>

Now, an example of a circuit configuration and operation of a position detection device 400 which performs detection of an indication position by the electronic pen 1 of the embodiment described hereinabove and detection of a writing pressure applied to the electronic pen 1 are described with reference to FIG. 4.

Figure 4:
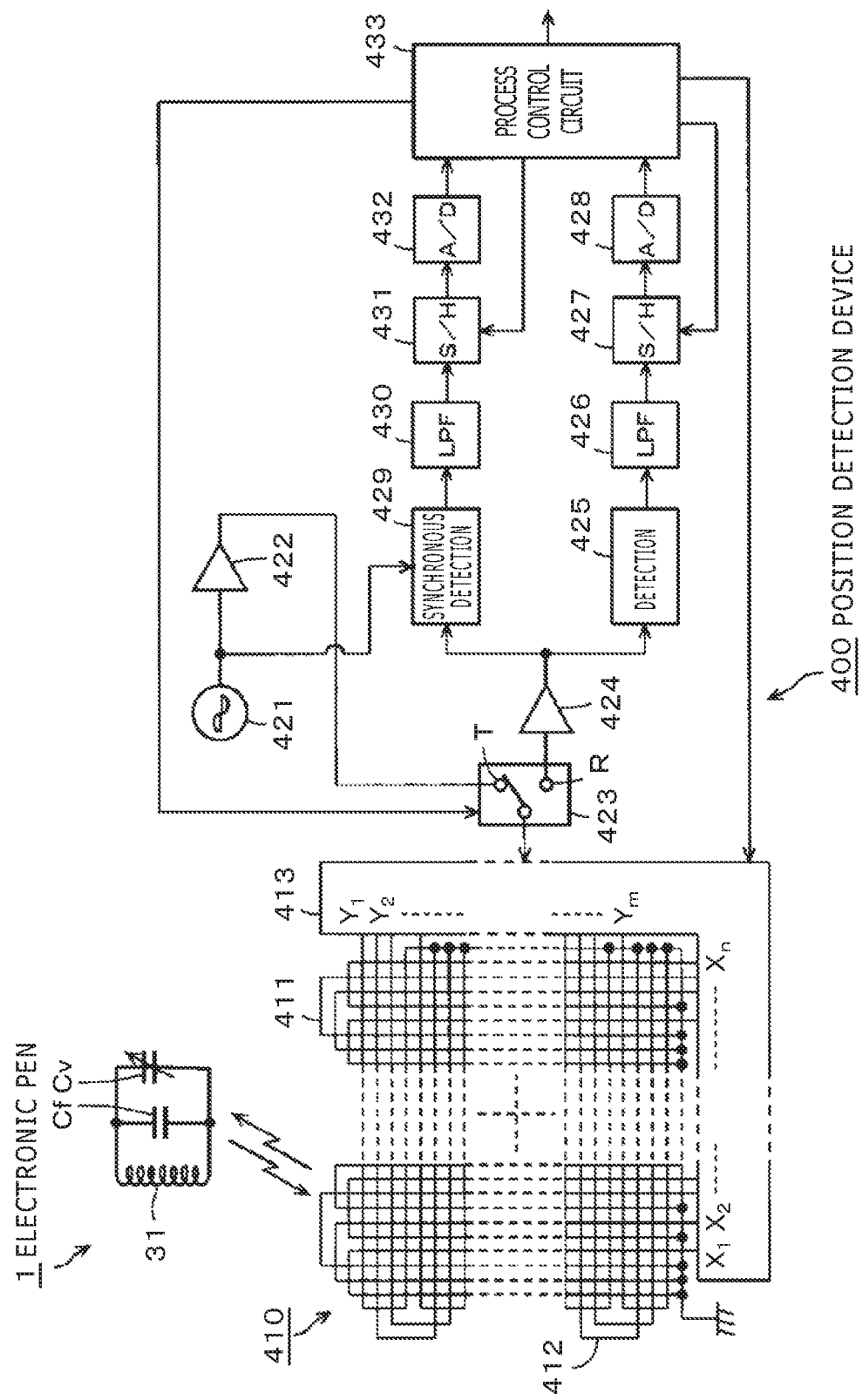
FIG. 4 is a view depicting a circuit configuration of an electronic pen according to an embodiment of the present disclosure together with a circuit configuration of a position detection device used together with the electronic pen.

As depicted in FIG. 4, the electronic pen 1 includes a resonance circuit in which a coil 31 as an inductance element, a variable capacitor Cv configured from the writing pressure detector 35, and a resonance capacitor Cf accommodated in the tubular body portion 33 are connected in parallel with each other.

Meanwhile, on the position detection device 400, an X-axis direction loop coil group 411 and a Y-axis direction loop coil group 412 are layered to form a position detection coil 410. The loop coil groups 411 and 412 are configured, for example, from n and m rectangular loop coils, respectively. The respective loop coils which configure the loop coil groups 411 and 412 are disposed in an equidistantly spaced relationship and in a successively overlapping relationship with each other.

Further, the position detection device 400 includes a selection circuit 413 to which the X-axis direction loop coil group 411 and the Y-axis direction loop coil group 412 are connected. The selection circuit 413 successively selects one of the loop coils in the two loop coil groups 411 and 412.

Further, the position detection device 400 includes an oscillator 421, a current driver 422, a changeover connection circuit 423, a reception amplifier 424, a detector 425, a low-pass filter 426, a sample and hold circuit 427, an analog to digital (A/D) conversion circuit 428, a synchronous detector 429, another low-pass filter 430, another sample and hold circuit 431, another A/D conversion circuit 432, and a process controlling control circuit 433. In one or more embodiments, the process control circuit 433 is configured from a microcomputer.

The oscillator 421 generates an alternating current (AC) signal of a frequency f0. Then, the oscillator 421 supplies the generated AC signal to the current driver 422 and the synchronous detector 429. The current driver 422 converts the AC signal supplied thereto from the oscillator 421 into current and sends out the current to the changeover connection circuit 423. The changeover connection circuit 423 changes over the connection destinations (transmission side terminal T and reception side terminal R) to which a loop coil selected by the selection circuit 413 is to be connected under the control of the process control circuit 433. The current driver 422 is connected to the transmission side terminal T and the reception amplifier 424 is connected to the reception side terminal R from between the connection destinations.

An induced voltage generated in a loop coil selected by the selection circuit 413 is sent to the reception amplifier 424 through the selection circuit 413 and the changeover connection circuit 423. The reception amplifier 424 amplifies the induced voltage supplied thereto from the loop coil and sends out the amplified induced voltage to the detector 425 and the synchronous detector 429.

The detector 425 detects an induced voltage generated in a loop coil, namely, a reception signal, and sends out the detected reception signal to the low-pass filter 426. The low-pass filter 426 has a cutoff frequency sufficiently lower than the frequency f0 described hereinabove, and converts an output signal of the detector 425 into a direct current (DC) signal and sends out the DC signal to the sample and hold circuit 427. The sample and hold circuit 427 holds a voltage value of the output signal of the low-pass filter 426 at a predetermined timing, in particular, at a predetermined timing within a reception period, and sends out the held voltage value to the A/D conversion circuit 428. The A/D conversion circuit 428 converts an analog output of the sample and hold circuit 427 into a digital signal and outputs the digital signal to the process control circuit 433.

On the other hand, the synchronous detector 429 synchronously detects an output signal of the reception amplifier 424 with an AC signal from the oscillator 421 and sends out a signal of a level according to a phase difference between the signals to the low-pass filter 430. The low-pass filter 430 has a cutoff frequency sufficiently lower than the frequency f0, and converts an output signal of the synchronous detector 429 into a DC signal and sends out the DC signal to the sample and hold circuit 431. The sample and hold circuit 431 holds a voltage value of the output signal of the low-pass filter 430 at a predetermined timing and sends out the held voltage value to the A/D conversion circuit 432. The A/D conversion circuit 432 converts an analog output of the sample and hold circuit 431 into a digital signal and outputs the digital signal to the process controlling 433.

The process control circuit 433 controls the components of the position detection device 400. In particular, the process control circuit 433 controls selection of a loop coil by the selection circuit 413, changeover of the changeover connection circuit 423, and timings of the sample and hold circuits 427 and 431. The process control circuit 433 causes a radio wave to be transmitted from the X-axis direction loop coil group 411 and the Y-axis direction loop coil group 412 with a fixed transmission duration (continuous transmission interval) on the basis of input signals from the A/D conversion circuits 428 and 432.

In each of the loop coils of the X-axis direction loop coil group 411 and the Y-axis direction loop coil group 412, an induced voltage is generated by a radio wave transmitted (fed back) from the electronic pen 1. The process control circuit 433 calculates coordinate values of the indicated position in the X-axis direction and the Y-axis direction by the electronic pen 1 on the basis of the level of the voltage value of the induced voltage generated in the loop coil. Further, the process control circuit 433 detects a writing pressure on the basis of the level of a signal according to a phase difference between the transmitted radio wave and the received radio wave.

In this manner, in the position detection device 400, the position of the electronic pen 1 coming near is detected by the process control circuit 433. Then, information of the writing pressure of the electronic pen 1 is obtained by detecting the phase of the received signal.

Further, since reduction in thickness of the electronic pen main body 3 can be implemented, it becomes possible for the electronic pen main body 3 to have a configuration with which it can have compatibility with the replacement core of a commercially available ballpoint pen.

Where the electronic pen main body 3 is configured so as to have compatibility with the replacement core of a commercially available ballpoint pen, there is a merit that the housing of a commercially available ballpoint pen can be diverted to the housing 2 of the electronic pen 1. In particular, the electronic pen 1 can be configured by accommodating the electronic pen main body 3 of the present embodiment into the housing of a ballpoint pen in place of the replacement core of a ballpoint pen.

Second Embodiment

The electronic pen of the present second embodiment is a modification to the first embodiment. In the first embodiment described above, only one electronic pen main body is accommodated in the housing. In the second embodiment, a plurality of electronic pen main bodies are accommodated in the housing, and one of the plurality of electronic pen main bodies is selected by a knock cam mechanism such that a tip of a pen tip portion of the elected electronic pen main body is projected from the opening at the pen tip side of the housing to use the electronic pen.

As described hereinabove, the electronic pen main body 3 of the electronic pen 1 of the first embodiment has a configuration that provides compatibility with the replacement core 6 of a ballpoint pen. As a commercially available ballpoint pen, a multicolored ballpoint pen in which replacement cores of different ink colors are mounted is available. The second embodiment provides an electronic pen configured by accommodating the electronic pen main body 3 in a housing of a configuration similar to that of the housing of the multicolored ballpoint pen.

Figure 5:
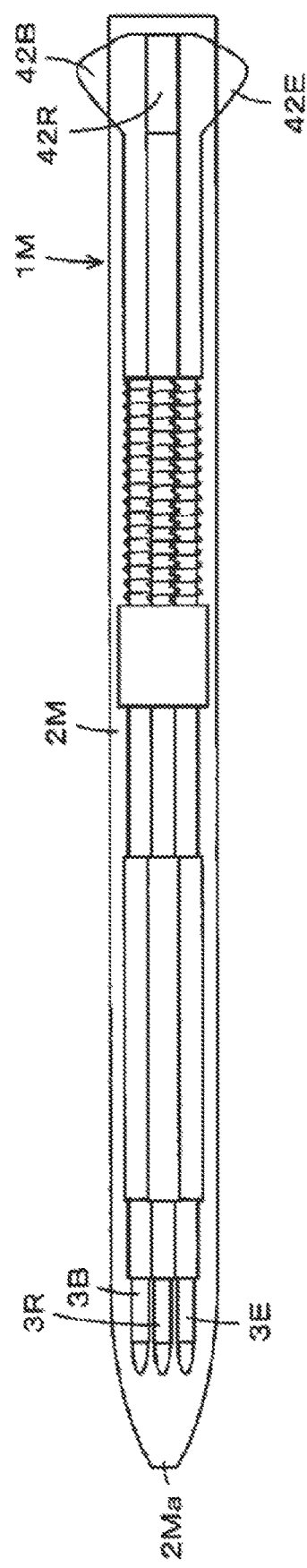
FIG. 5 is a view depicting an example of a configuration of an electronic pen according to a second embodiment of the present disclosure.

FIG. 5 is a view of a configuration depicting an appearance of an electronic pen 1M of the second embodiment. Also in the example of FIG. 5, a housing 2M of the electronic pen 1M is configured from a transparent synthetic resin material such that the inside thereof can be seen through the housing 2M.

The housing 2M of the electronic pen 1M has a configuration that is the same as that of the housing and the knock cam mechanism of a commercially available knock type multicolored ballpoint pen. The housing and the knock cam mechanism of a commercially available knock type multicolored ballpoint pen may be used as they are. In the housing 2M, in the present example, three electronic pen main bodies 3B, 3R, and 3E are accommodated.

The electronic pen main bodies 3B, 3R, and 3E are configured similarly in external shape to the electronic pen main body 3 of the first embodiment except that they are configured the same in size as the replacement core of a multicolored ballpoint pen. However, in the electronic pen main bodies 3B, 3R, and 3E in the case of the second embodiment, not only a resonance capacitor Cf that configures the resonance circuit described hereinabove but also an integrated circuit (IC) and a peripheral circuit for implementing a function for transmitting its own identification information to a position detection device are provided in the tubular body portion 33 in which electronic circuit parts are disposed. The configuration of the other part of the electronic pen main bodies 3B, 3R, and 3E is similar to that of the electronic pen main body 3 of the first embodiment.

Further, the knock cam mechanism of the electronic pen 1M includes knock bars 42B, 42R, and 42E with which the electronic pen main bodies 3B, 3R, and 3E are fitted, respectively. Thus, if one of the knock bars 42B, 42R, and 42E is slidably moved to the pen tip side, then the tip end portion 34a of the core body 34 of the one of the electronic pen main bodies 3B, 3R, and 3E and part of the coil non-wound portion 32b of the ferrite core 32 are projected to establish electromagnetic induction coupling to the sensor of the position detection device.

Further, in the case of the present embodiment, the position detection device used together with the electronic pen main bodies 3B, 3R, and 3E has a function for receiving and deciding identification information transmitted from each of the electronic pen main bodies 3B, 3R, and 3E. In other words, the position detection device in the case of the present embodiment decides differences among the electronic pen main bodies 3B, 3R, and 3E and implements functions individually allocated to the electronic pen main bodies 3B, 3R, and 3E.

In the example described below, for example, the electronic pen main body 3B has allocated thereto a function representing a locus (character or figure) to be displayed in response to the indication position thereby in black; the electronic pen main body 3R has allocated thereto a function for representing a locus to be displayed in response to the indication position thereby in red; and the electronic pen main body 3E has allocated thereto a function for erasing a locus indicated and inputted previously in response to the indication position thereby. The function to be allocated to each of the electronic pen main body units is not limited to such a display color of a locus according to an indication position as in the case of the present example, but may be a thickness of a locus, a type of a line to be displayed such as a solid line, a dotted line, or a dash-dotted line or the like.

Figure 6:
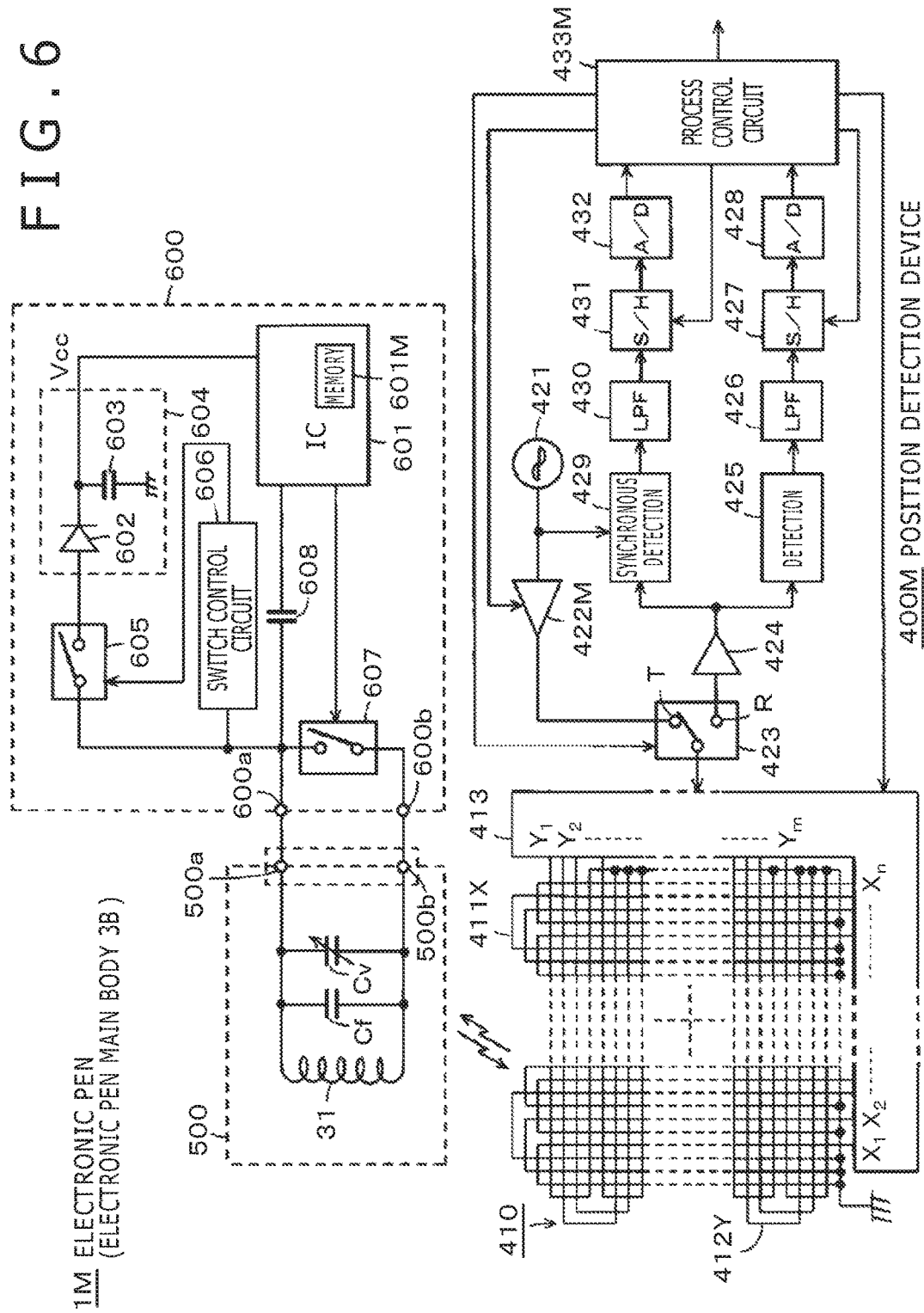
FIG. 6 is a view depicting a circuit configuration of an electronic pen according to the second embodiment of the present disclosure together with a circuit configuration of a position detection device used together with the electronic pen.

FIG. 6 is a view depicting a circuit configuration of the electronic pen 1M and a position detection device 400M where the electronic pen main bodies 3B, 3R, and 3E are configured such that identification information of each of the electronic pen main bodies 3B, 3R, and 3E (hereinafter referred to as identification (ID) signal) is transmitted to the position detection device 400 which is used together with the electronic pen 1M. In FIG. 6, the circuit configuration of the electronic pen 1M is depicted as a representative of one of the electronic pen main bodies 3B, 3R, and 3E. It is needless to say that the other electronic pen main bodies 3R and 3E have a same circuit configuration and perform same operation.

In the following description, a case is described in which, in the electronic pen 1M, when the knock bar 42B is slidably moved, the tip end portion 34a of the core body 34 and part of the coil non-wound portion 32b of the ferrite core 32 are projected to the outside from an opening 2Ma of the housing 2M to establish electromagnetic induction coupling of the electronic pen main body 3B to the position detection device 400M. It is to be noted that, in the following description, the same elements of the electronic pen main body 3B to those of the electronic pen main body 3 of the first embodiment are denoted by the same reference symbols, and the same elements of the position detection device 400M to those of the position detection device 400 in the first embodiment are denoted by the same reference symbols.

The electronic pen main body 3B includes, similarly to the electronic pen main body 3 of the first embodiment, a parallel resonance circuit 500 in which the resonance capacitor Cf provided in the tubular body portion 33 and the variable capacitor Cv of the writing pressure detector 35 are connected in parallel to the coil 31, and an ID transmission circuit 600.

Terminals 500a and 500b connected to one end and the other end of the coil 31 of the parallel resonance circuit 500 are connected to two terminals 600a and 600b of the ID transmission circuit 600, respectively.

The ID transmission circuit 600 includes an IC 601 as an ID generation controlling circuit as depicted in FIG. 6. The IC 601 is configured such that it operates with a power supply voltage Vcc obtained by rectifying an AC signal received from the position detection device 400M through electromagnetic induction coupling by the parallel resonance circuit 500 using a rectification circuit (power supplying circuit) 604 configured from a diode 602 and a capacitor 603. Further, in the present example, a switch circuit 605 which normally is in an open (normally open) state is provided between the terminal 600a and the power supplying circuit 604. The switch circuit 605 is configured, for example, from a semiconductor switch circuit and indicates, in an open state thereof, a high impedance state.

The switch circuit 605 is controlled so as to have an on state by a switch controlling signal from the switch controlling circuit 606. The switch controlling circuit 606 generates a switch controlling signal from an AC signal received from the position detection device 400M through electromagnetic induction coupling by the parallel resonance circuit 500 using.

Further, in the ID transmission circuit 600, a switch circuit 607 is connected in parallel to the parallel resonance circuit 500. The switch circuit 607 is configured so as to be controlled between on and off by the IC 601.

The IC 601 in the present example has stored in a memory 601M built therein an ID signal which is formed, for example, from a digital signal of 8 bits including a manufacturer number, a product number, and information of a type and so forth of such a function as described hereinabove of the electronic pen main body 3B. Further, by controlling the switch circuit 607 between on and off with the ID signal stored in the memory 601M, the IC 601 interrupts an AC signal received from the position detection device 400M to generate an amplitude shift keying (ASK) signal and transmits the ID signal to the position detection device 400M.

On the other hand, the position detection device 400M of the example of FIG. 6 is configured such that, in the configuration of the position detection device 400 depicted in FIG. 4, a current driver 422M whose gain can be variably adjusted by a gain controlling signal from the outside is provided in place of the current driver 422 whose gain is fixed and a process control circuit 433M is provided in place of the process control circuit 433. The other components are quite similar to those of the position detection device 400 depicted in FIG. 4.

The current driver 422M is configured such that it can receive a gain controlling signal from the process control circuit 433M to change the signal level of a transmission signal.

Further, the process control circuit 433M is configured, for example, from a microcomputer and performs, through transmission and reception of an electromagnetic induction signal to and from the electronic pen 1M similarly as in the process control circuit 433 described hereinabove, detection of a position indicated by the electronic pen 1M and detection of a writing pressure applied to the electronic pen 1M. In addition, the process control circuit 433M supplies a signal for intermittently controlling a transmission signal and a signal for transmission signal level control to the current driver 422M and performs a reception signal of an ID signal from the electronic pen 1M. The process control circuit 433M detects an intermittent signal from the electronic pen 1M as a digital signal of several bits, for example, 8 bits to detect an ID signal as hereinafter described.

In the following, transmission and reception of an ID signal, a position detection operation, and a writing pressure detection operation are described taking a case in which electromagnetic induction coupling is established between the electronic pen main body 3B of the electronic pen 1M and the position detection device 400M.

In the electronic pen main body 3B, when the switch circuit 605 is off and the power supply voltage Vcc is not supplied from the power supplying circuit 604, the IC 601 is inoperative, and at this time, when viewed from the parallel resonance circuit 500 side, the ID transmission circuit 600 has a high impedance, and to the parallel resonance circuit 500, this is equivalent to a state in which nothing is connected thereto. Accordingly, at this time, the resonance frequency of the parallel resonance circuit 500 is not influenced by the ID transmission circuit 600. It is to be noted that, to the IC 601, an electromagnetic induction signal transmitted from the position detection device 400M is supplied as a synchronizing signal for sending and receiving an electromagnetic induction signal to and from the position detection device 400M through a capacitor 608.

Figure 7:
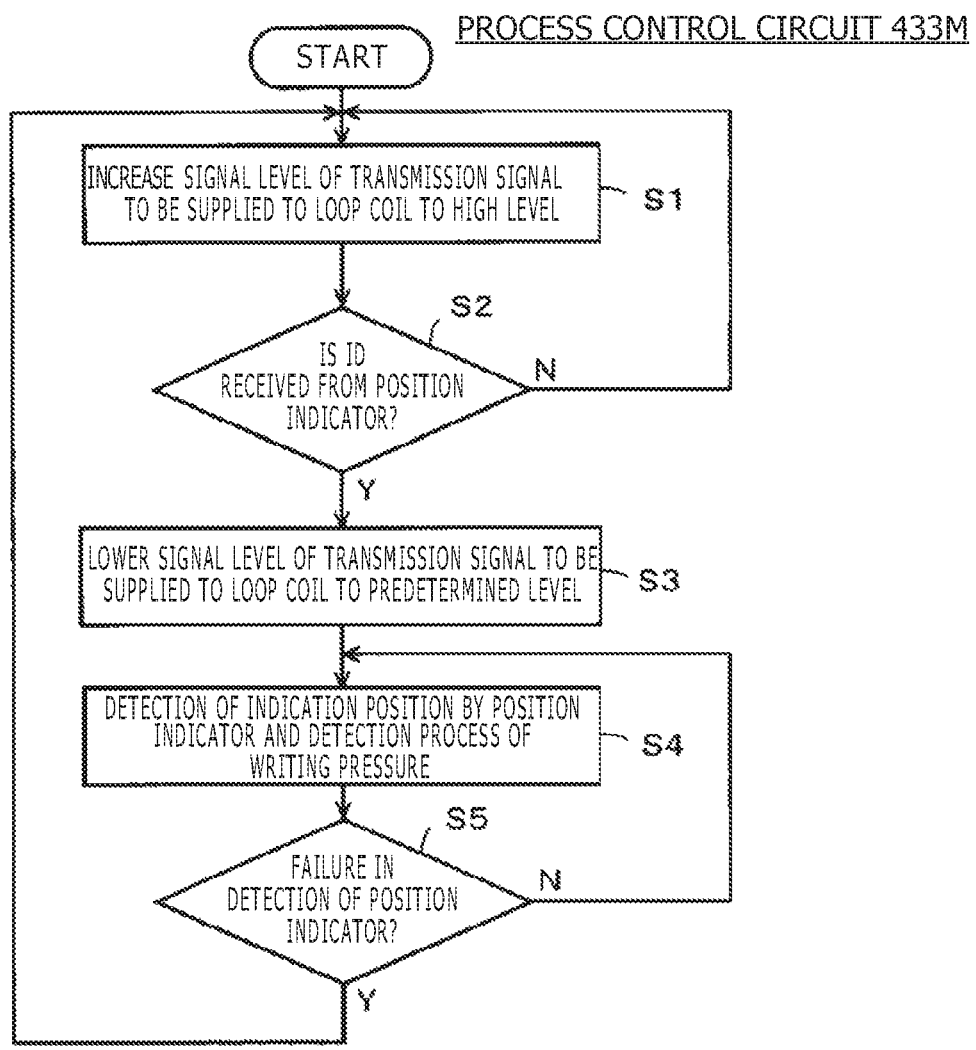
FIG. 7 is a flow chart illustrating an example of processing operations performed by the position detection device with which the electronic pen of the second embodiment is used.

FIG. 7 is a flow chart illustrating processing operations of the process control circuit 433M of the position detection device 400M, and when the power supply to the position detection device 400M is on, the processes of FIG. 7 is repetitively performed.

In particular, the process control circuit 433M first supplies a gain controlling signal for increasing the signal level to a high level of a transmission signal to the current driver 422M. Consequently, the AC signal of the frequency f0 from the oscillator 421 is increased in level to a high level signal by the current driver 422M and supplied to the loop coil group 411X or 412Y through the selection circuit 413 (S1).

The electronic pen main body 3B of the electronic pen 1M receives an electromagnetic induction signal by the AC signal of the high level from the position detection device 400M by the parallel resonance circuit 500. At this time, in response to that the signal level of the AC signal from the position detection device 400M is high, the switch controlling circuit 606 generates a switch controlling signal for switching on the switch circuit 605 from the AC signal received by the parallel resonance circuit 500. Consequently, when the switch circuit 605 is switched on, a power supply voltage Vcc generated by rectifying the AC signal received by the parallel resonance circuit 500 is supplied from the power supplying circuit 604 to the IC 601.

When the power supply voltage Vcc is supplied to the IC 601, the IC 601 starts operation. The IC 601 generates an ID signal of the electronic pen main body 3B as a digital signal and controls the switch circuit 607 between on and off by the digital signal to control the parallel resonance circuit 500 between on and off. Consequently, from the electronic pen main body 3B of the electronic pen 1M, the electromagnetic induction signal formed as an ASK signal by interrupting the AC signal from the position detection device 400M with the ID signal is transmitted to the position detection device 400M.

In particular, for example, when the bit of the ID signal is "1" and the switch circuit 607 is off, the parallel resonance circuit 500 can perform a resonance operation to the AC signal transmitted thereto from the position detection device 400M and send back an electromagnetic induction signal to the position detection device 400M. A loop coil of the position detection device 400M receives the electromagnetic induction signal from the parallel resonance circuit 500 of the electronic pen main body 3B of the electronic pen 1M. On the other hand, when the bit of the ID signal is "0" and the switch circuit 607 is on, the parallel resonance circuit 500 is placed into a state in which a resonance operation thereof to the AC signal from the position detection device 400M is inhibited, and therefore, the electromagnetic induction signal is not sent back from the parallel resonance circuit 500 to the position detection device 400M, and the loop coil of the position detection device 400M does not receive a signal from the electronic pen main body 3B of the electronic pen 1M.

In the present example, the process control circuit 433M of the position detection device 400M performs detection of a presence or absence of a reception signal from the electronic pen main body 3B of the electronic pen 1M by eight times thereby to receive a digital signal of 8 bits. In particular, since, at S1, the process control circuit 433M controls the gain of the current driver 422M to establish a state in which a transmission signal is sent out with the signal level thereof set to the high level and detects an ID signal of 8 bits from the electronic pen main body 3B of the electronic pen 1M, transmission and reception are successively performed by eight times at timings similar to those upon coordinate detection.

Then, the process control circuit 433M of the position detection device 400M can receive an ID signal in the form of a digital signal of 8 bits by performing detection of presence or absence of a reception signal from the electronic pen main body 3B of the electronic pen 1M by eight times.

The process control circuit 433M of the position detection device 400M performs such processes as described above to decide whether or not it fails in reception of an ID signal from the electronic pen main body 3B of the electronic pen 1M (S2). Then, if it is decided that the process control circuit 433M fails in reception of an ID signal within a predetermined period of time, then the process returns to S1, at which the process control circuit 433M performs transmission of a transmission signal of the high level successively by a predetermined number of times. It is to be noted that, in place of the transmission signal of the high level, a burst signal of a predetermined level having a long signal duration may be used as the transmission signal.

If the process control circuit 433M fails to receive an ID signal even if it successively performs the reception process for an ID signal by the predetermined number of times, then it decides that the electronic pen 1M does not have a function for sending out an ID signal and skips the reception process for an ID signal.

Then, if it is decided at S2 that an ID signal is received, then the process control circuit 433M lowers the gain of the current driver 422M to lower the signal level for the transmission signal to a predetermined level (normal use level) from the high level set at step S1 (S3). The predetermined level at this time is set to a level with which, although detection of an indication position and detection of a writing pressure by the electronic pen main body 3B of the electronic pen 1M can be performed by the position detection device 400M, the switch controlling circuit 606 of the electronic pen main body 3B of the electronic pen 1M cannot switch on the switch circuit 605.

After the signal level of the electromagnetic induction signal transmitted from the position detection device 400M is set to the predetermined level (normal use state) in this manner, the switch controlling circuit 606 of the electronic pen main body 3B of the electronic pen 1M does not output the switch controlling signal for switching on the switch circuit 605. Therefore, since supply of the power supply voltage Vcc from the power supplying circuit 604 to the IC 601 stops and the IC 601 is rendered inoperative, the processes of the flow chart of FIG. 7 come to an end, and the electronic pen main body 3B of the electronic pen 1M stops the transmission of an ID signal.

However, since the state in which the signal level of the electromagnetic induction signal transmitted from the position detection device 400M is set to the predetermined level (normal use state) is quite similar to that in the case of FIG. 4, the process control circuit 433M of the position detection device 400M performs a process for detecting, through transmission and reception of an electromagnetic induction signal to and from the parallel resonance circuit 500 of the electronic pen main body 3B of the electronic pen 1M, an indication position and a writing pressure by the electronic pen main body 3B of the electronic pen 1M in such a manner as described hereinabove in connection with the first embodiment (S4).

Then, the process control circuit 433M monitors the sending back of an electromagnetic induction signal from the parallel resonance circuit 500 of the electronic pen main body 3B of the electronic pen 1M and decides whether or not a state in which the process control circuit 433M fails to detect the electronic pen main body 3B of the electronic pen 1M is entered because the sending back of the electromagnetic induction signal stops (S5). If it is decided at S5 that the process control circuit 433M does not fail to detect the electronic pen main body 3B of the electronic pen 1M, then the process control circuit 433M returns its process to S4. However, if it is decided at S5 that process control circuit 433M fails to detect the electronic pen main body 3B of the electronic pen 1M, then the process control circuit 433M returns its process to S1, at which it supplies a gain controlling signal for increasing the signal level of the transmission signal to the high level to the current driver 422M thereby to increase the signal level of the transmission signal to be supplied to each of the loop coil groups 411X and 412Y to the high level. Then, the process control circuit 433M repeats the processes beginning with S1.

Effects of Second Embodiment

With the second embodiment described above, the position indictor can accommodate a plurality of electronic pen main bodies therein and each of the electronic pen main bodies can transmit an own ID signal to the position detection device. Further, the position detection device used together with the electronic pen of the second embodiment can decide a predetermined function process allocated to any of the electronic pen main bodies by detecting the ID signal of the electronic pen main bodies, and this is very convenient. Further, with the position indicator of the second embodiment, since the plurality of electronic pen main bodies are selectively used, there is a merit that various functions can be implemented without performing function selection by the position detection device side.

Further, in the electronic pen of the second embodiment described above, since the housing and the knock cam mechanism are configured similarly to those of a commercially available multicolored ballpoint pen, the replacement core of a ballpoint pen can be accommodated into and used together with the housing of the position indicator in place of any of the electronic pen main bodies. Consequently, the electronic pen of the second embodiment can have both a function as a ballpoint pen of a writing utensil and a function of an electronic pen used together with a position detection device.

Modification to Second Embodiment

It is to be noted that, in the example described above, the switch controlling circuit 606 of each of the electronic pen main bodies 3B, 3R, and 3E is configured such that, when an electromagnetic induction signal of the high level from the position detection device 400M is received by the parallel resonance circuit 500, the switch controlling circuit 606 generates a switch controlling signal for switching on the switch circuit 605 on the basis of the received electromagnetic induction signal of the high level and supplies a power supply voltage Vcc to the IC 601 with the switch controlling signal.

However, the method of the switch controlling circuit 606 for switching on the switch circuit 605 to supply the power supply voltage Vcc to the IC 601 is not limited to such a method as described above. For example, as another example, such a configuration may be adopted that a predetermined digital signal is sent from the position detection device 400M to the electronic pen main bodies 3B, 3R, or 3E such that the switch controlling circuit 606 of the electronic pen main bodies 3B, 3R, or 3E which receives the digital signal generates a switch controlling signal for switching on the switch circuit 605.

While the identification information of the electronic pen main bodies 3B, 3R, and 3E is transmitted, in the description given above, to the position detection device by controlling the resonance circuit, a wireless transmission, for example, of a near field communication (NFC) standard or the Bluetooth (registered trademark) standard may be provided separately such that the identification information is transmitted to the position detection device through the wireless transmission.

Third Embodiment

The embodiments described above are configured such that the end portion 34*b* of the core body 34 inserted in the through-hole 32*d* of the ferrite core 32 is fitted with the writing pressure detector 35 such that a writing pressure applied to the tip end portion 34*a* of the core body 34 is detected by the writing pressure detector 35. Therefore, it is necessary for the ferrite core 32 to have the through-hole 32*d* and it is necessary for the core body 34 to be formed as an elongated bar-like member.

However, also a configuration in which a through-hole is not formed in the ferrite core can be implemented by devising a detection method for a writing pressure applied to the core body. The third embodiment is an example in this case.

Figure 8A:
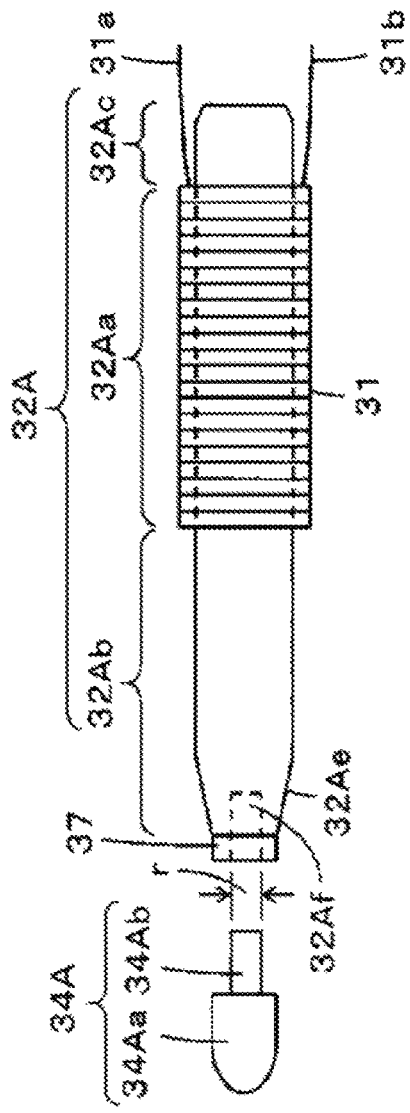
FIGS. 8A and 8B show views illustrating an example of a configuration of part of an electronic pen according to a third embodiment of the present disclosure.
Figure 8B:
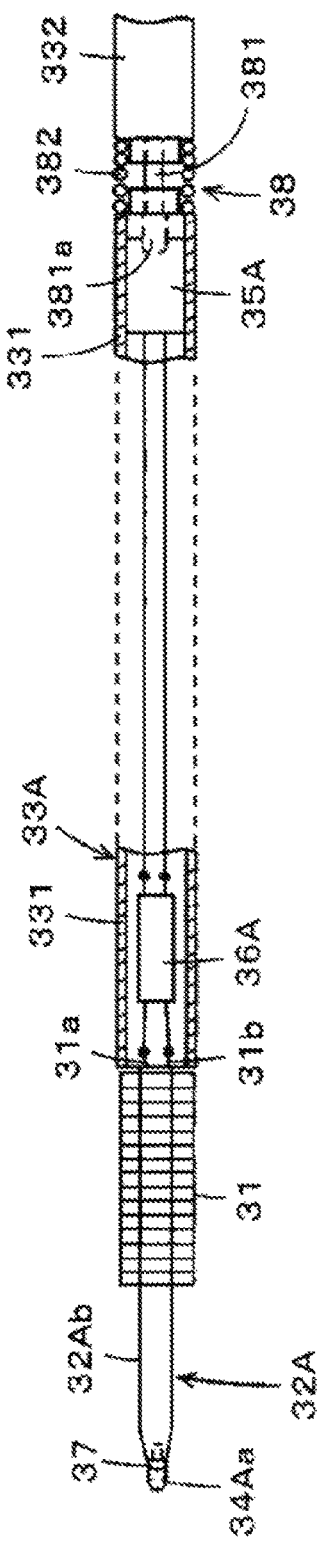

FIGS. 8A and 8B show views illustrating an example of a configuration of part of the present third embodiment. FIG. 8A depicts an example of a configuration of a ferrite core 32A and a core body 34A used in an electronic pen main body 3A of the third embodiment. In the third embodiment, the ferrite core 32A does not have the through-hole 32*d* but includes, at the core body 34A side, a recessed portion 32Af with which the core body 34A is to be fitted in place of the through-hole 32*d*. The inner diameter of the recessed portion 32Af is, for example, equal to the diameter r of the through-hole 32*d* of the ferrite core 32 described hereinabove. Further, in the third embodiment, a through-hole of a diameter r is provided at the center of an end face of a tapered portion 32*e* of the ferrite core 32A at the core body 34A side. A washer member 37 formed, for example, from a resin material is fixed, for example, by adhesion.

The core body 34A in the third embodiment is configured from a pen tip portion 34Aa and a protrusion 34Ab of the diameter r projecting from an end face of the pen tip portion 34Aa toward the ferrite core 32A side. The protrusion 34Ab of the core body 34A is press fitted in the recessed portion 32Af of the ferrite core 32A with the washer member 37 interposed therebetween. The core body 34A is elastically engaged at the protrusion 34Ab thereof with the washer member 37 such that it is fitted so as not to be removed readily from the fitting portion 32Af of the ferrite core 32A. However, by strongly pulling out the core body 34A, the core body 34A can be removed from the ferrite core 32A.

The ferrite core 32A is configured with an equal size similarly to the ferrite core 32 of the first embodiment described hereinabove except that it does not include the through-hole 32*d* and includes a wound portion 32Aa by the coil 31, a first coil non-wound portion 32Ab, and a second coil non-wound portion 32Ac. Accordingly, though not depicted, in a state in which the pen tip portion 34Aa of the core body 34A projects to the outside from the opening 2*b* of the housing 2 of the electronic pen by a knock operation, also the first coil non-wound portion 32Ab of the ferrite core 32A is placed in a state in which it projects to the outside from the opening 2*b* of the housing 2 in a similar manner as in the first embodiment.

FIG. 8B depicts part of the electronic pen main body 3A in the third embodiment. As depicted in FIG. 8B, in the electronic pen main body 3A in the third embodiment, a tubular body portion 33A is configured from two portions of a first tubular body portion 331 and a second tubular body portion 332 separate from each other in the axial direction.

Further, in the third embodiment, a writing pressure detector 35A is provided in the proximity of a coupling portion 38 between the first tubular body portion 331 and the second tubular body portion 332.

Further, as depicted in FIG. 8B, in the present example, the first tubular body portion 331 and the second tubular body portion 332 are coupled to each other at the coupling portion 38 through a connection bar member 381 and a coil spring 382. In this case, the first tubular body portion 331 and the second tubular body portion 332 are configured such that, although they are normally elastically displaced so as to move away from each other in the axial direction by the coil spring 382, they are locked at a predetermined position by the connection bar member 381 such that they are not displaced any more in the axial direction. Further, the first tubular body portion 331 and the second tubular body portion 332 are configured such that the overall length of the electronic pen main body 3A in the locked state of the first tubular body portion 331 and the second tubular body portion 332 is equal to the overall length L2 of the replacement core 6 of the ballpoint pen described hereinabove.

Further, as depicted in FIG. 8B, in the present embodiment, the writing pressure detector 35A is provided in the proximity of the coupling portion 38 of the first tubular body portion 331. Further, the connection bar member 381 is configured such that one end 381a side thereof operates as a pressing portion for the writing pressure detector 35A.

Further, in the first tubular body portion 331, a printed circuit board 36A on which a capacitor (not depicted) which cooperates with the coil 31 to configure a resonance circuit is mounted is disposed, and one end and the other end of a variable capacitor which configures the writing pressure detector 35A are electrically connected such that the variable capacitor is connected in parallel to the capacitor of the printed circuit board 36A. Further, the one ends 31a and 31b of the coil 31 are electrically connected such that the coil 31 is connected in parallel to the capacitor of the printed circuit board 36A.

The writing pressure detector 35A of the present example can be configured as a variable capacitor which uses writing pressure detection means of a known configuration disclosed, for example, in Patent Document: Japanese Patent Laid-Open No. 2011-186803 and whose capacitance varies in response to the writing pressure. Further, the writing pressure detector 35A may be configured also such that it uses such a semiconductor element whose capacitance varies in response to a writing pressure as disclosed, for example, in Japanese Patent Laid-Open No. 2013-161307.

If a pressure is applied to the core body 34 in a state in which the pen tip portion 34Aa of the core body 34A of the electronic pen main body 3A projects to the outside from the opening 2b of the housing 2, then a force tending to move the entirety of the first tubular body portion 331 side of the electronic pen main body 3A toward the second tubular body portion 332 side against the elastic force of the coil spring 382 operates, and the capacitance of the writing pressure detector 35A exhibits a value corresponding to the writing pressure. In this manner, in the third embodiment, even if a through-hole is not provided in the ferrite core, the writing pressure applied to the core body 34A can be detected.

Fourth Embodiment

The foregoing relates to a case in which the present disclosure is applied to an electronic pen of the electromagnetic induction type. However, the present disclosure can be applied also to an active capacitive pen which is an example of an electronic pen of the capacitive type. In the electronic pen of the fourth embodiment described below, a coil wound on a ferrite core is part of a charging circuit which charges the power supply to a signal generation circuit.

Figure 9:
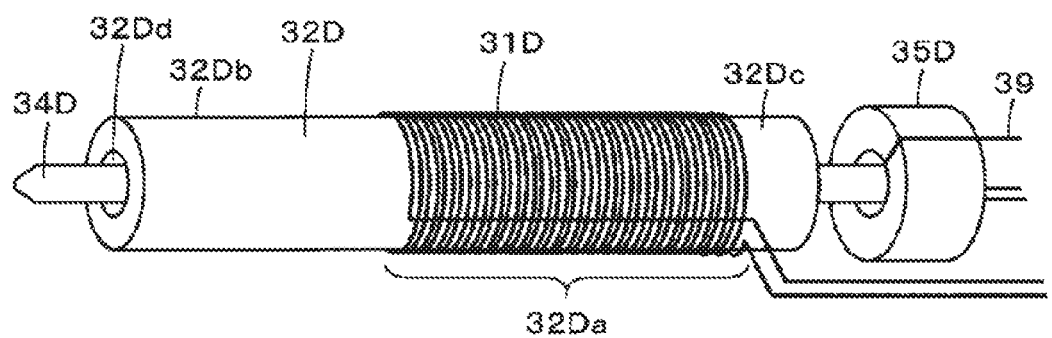
FIG. 9 is a view illustrating an example of a configuration of part of an electronic pen according to a fourth embodiment of the present disclosure.
Figure 10:
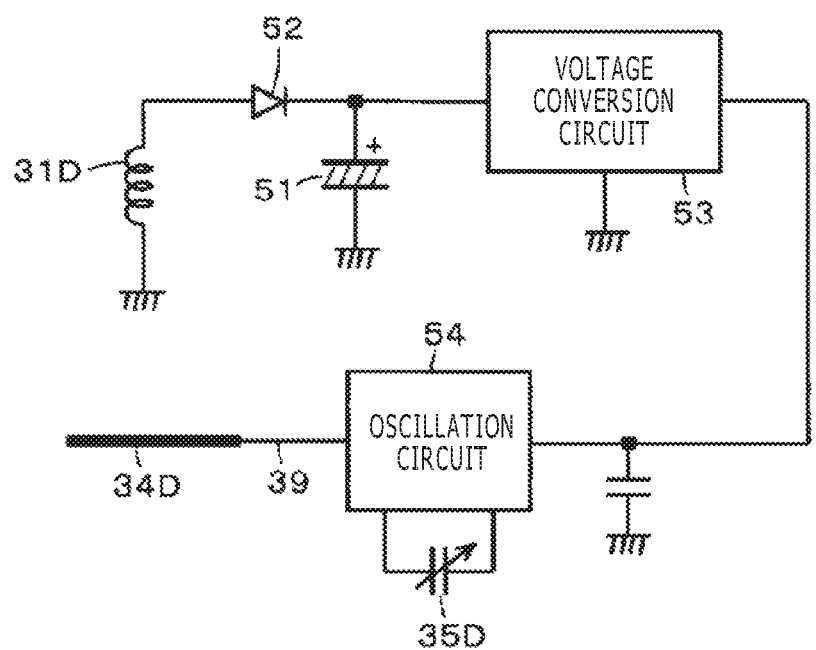
FIG. 10 is a view illustrating an example of a circuit configuration of an electronic pen according to the fourth embodiment of the present disclosure.

FIG. 9 is a view depicting an internal structure of a position indicator of a stylus pen of the capacitive type which is an example of the electronic pen of the fourth embodiment. FIG. 10 is a circuit configuration diagram of the electronic pen of the present fourth embodiment. In FIGS. 9 and 10, the same components are denoted by the same reference symbols.

In the electronic pen of the fourth embodiment, the configuration of the pen tip side is similar to that in the first embodiment described hereinabove with reference to FIGS. 1 and 2. In particular, a ferrite core 32D has a through-hole 32Dd extending in an axial direction, and a coil 31D is partially wound on the ferrite core 32D. Further, similarly as in the first embodiment, the ferrite core 32D has formed thereon a coil wound portion 32Da on which the coil 31D is wound in the axial direction of the ferrite core 32D and has a first coil non-wound portion 32Db formed at the pen tip side thereof while it has a second coil non-wound portion 32Dc formed at the opposite side to the pen tip side thereof.

Further, in the fourth embodiment, a core body 34D is configured as an electrode core formed from a hard resin material in which a conductor such as, for example, a conductive metal or conductive powder is mixed. In the following description, the core body 34D is referred to as electrode core 34D.

The electrode core 34D is inserted into the through-hole 32Dd of the ferrite core 32D and fitted with a writing pressure detector 35D similarly as in the case of the first embodiment. The writing pressure detector 35D is provided in a tubular body portion of an electronic pen main body coupled to the ferrite core 32D and has a configuration of a variable capacitor similarly as the first embodiment described hereinabove. The electrode core 34D is a unitary member configured from an electrode and a pressing body which is fitted with the writing pressure detector 35D having a configuration of a variable capacitor.

It is to be noted that, though not depicted in FIG. 9, a printed circuit board on which a signal generation circuit which sends out a signal to the outside through the electrode core 34D is mounted is disposed in a tubular body portion of the electronic pen main body. The electrode core 34D is connected to the signal generation circuit of the printed circuit board by a connection line 39. In the following, a circuit configuration of the electronic pen of the fourth embodiment is described.

Referring to FIG. 10, reference numeral 51 denotes an electric double layer capacitor, 52 a rectification diode, 53 a voltage conversion circuit, and 54 an oscillation circuit which configures the signal generation circuit of the present example. As depicted in FIG. 10, in the present example, one end of the coil 31D is connected to the anode of the diode 52, and the other end of the coil 31D is grounded (GND). Further, one end of the electric double layer capacitor 51 is connected to the cathode of the diode 52, and the other end of the electric double layer capacitor 51 is grounded.

The electrode core 34D extends through the through-hole 32Dd of the ferrite core 32D on which the coil 31D is wound and is physically coupled to (engaged with) the writing pressure detector 35D which configures a variable capacitor. Further, the electrode core 34D is electrically connected to the connection line 39 at the above-described coupling portion between the electrode core 34D and the writing pressure detector 35D which configures the variable capacitor. The connection line 39 electrically connects the electrode core 34D and the oscillation circuit 54 to each other. Accordingly, through the physical coupling between the electrode core 34D and the writing pressure detector 35D which configures the variable capacitor, a pressure (writing pressure) applied to the electrode core 34D is transmitted to the writing pressure detector 35D, and a transmission signal from the oscillation circuit 54 is transmitted from the electrode core 34D through the connection line 39.

The oscillation circuit 54 generates a signal whose frequency varies in response to the capacitance of the variable capacitor of the writing pressure detector 35D and supplies the generated signal to the electrode core 34D. The signal from the oscillation circuit 54 is radiated as an electric field based on the signal from the electrode core 34D. The oscillation circuit 54 is configured from an inductance-capacitance (LC) oscillation circuit which utilizes, for example, resonance by a coil and a capacitor. In a tablet which detects a coordinate position of a stylus pen of the capacitive type of the example of the electronic pen of the present embodiment, a writing pressure applied to the electrode core 34D can be determined from the frequency of the signal.

The voltage conversion circuit 53 converts a voltage stored in the electric double layer capacitor 51 into a fixed voltage and supplies the fixed voltage as a power supply for the oscillation circuit 54. The voltage conversion circuit 53 may be of the step-down type by which the voltage thereof becomes lower than a voltage across the electric double layer capacitor 51 or of the step-up type by which the voltage thereof becomes higher than a voltage across the electric double layer capacitor 51. Alternatively, the voltage conversion circuit 53 may be of the step-up and step-down type which operates as a step-down circuit when the voltage across the electric double layer capacitor 51 is higher than the fixed voltage but operates as a step-up circuit when the voltage across the electric double layer capacitor 51 is lower than the fixed voltage.

When the stylus pen of the capacitive type of the present embodiment is mounted on a charger not depicted, induced electromotive force is generated in the coil 31D by an alternating magnetic field generated by the charger and charges the electric double layer capacitor 51 through the diode 52.

When the stylus pen of the capacitive type of the present embodiment operates normally (when it does not perform charging operation), since the coil 31D has a fixed potential (in the present example, the ground potential (GND)), it acts as a shield electrode provided around the electrode core 34D. It is to be noted that the fixed potential of the coil 31D when the stylus pen of the capacitive type operates normally is not limited to the ground potential but may be a positive side potential with respect to the power supply or may be an intermediate potential between the positive side potential of the power supply and the ground potential.

With the stylus pen of the capacitive type which is an example of the electronic pen of the fourth embodiment described above, since the electrode core 34D is disposed so as to extend through the coil 31D for charging, the following effects are achieved. A writing pressure applied to the electrode core 34D is transmitted to the writing pressure detector 35D without being inhibited. The cross-sectional area of the coil 31D for charging can be made great, and therefore, charging can be performed at a high speed and with a high efficiency. The coil 31D for charging and the electrode core 34D can be disposed in a limited space, and the stylus pen of the capacitive type can be formed thin.

Further, with the stylus pen of the capacitive type which is an example of the electronic pen of the fourth embodiment described above, when it is in normal operation not in charging operation, since the coil 31D for charging acts as a shield electrode, even if the housing 2 of the electronic pen is grasped by a hand, this does not have an influence on a signal to be outputted from the electrode core 34D.

Further, with the stylus pen of the capacitive type which is an example of the electronic pen of the fourth embodiment described above, since the coil 31D for non-contact charging is provided around the electrode core 34D, a stylus pen of the capacitive type which allows non-contact charging thereof by a charger of a shape of a pen stand and is good in operability can be implemented.

Figure 11:
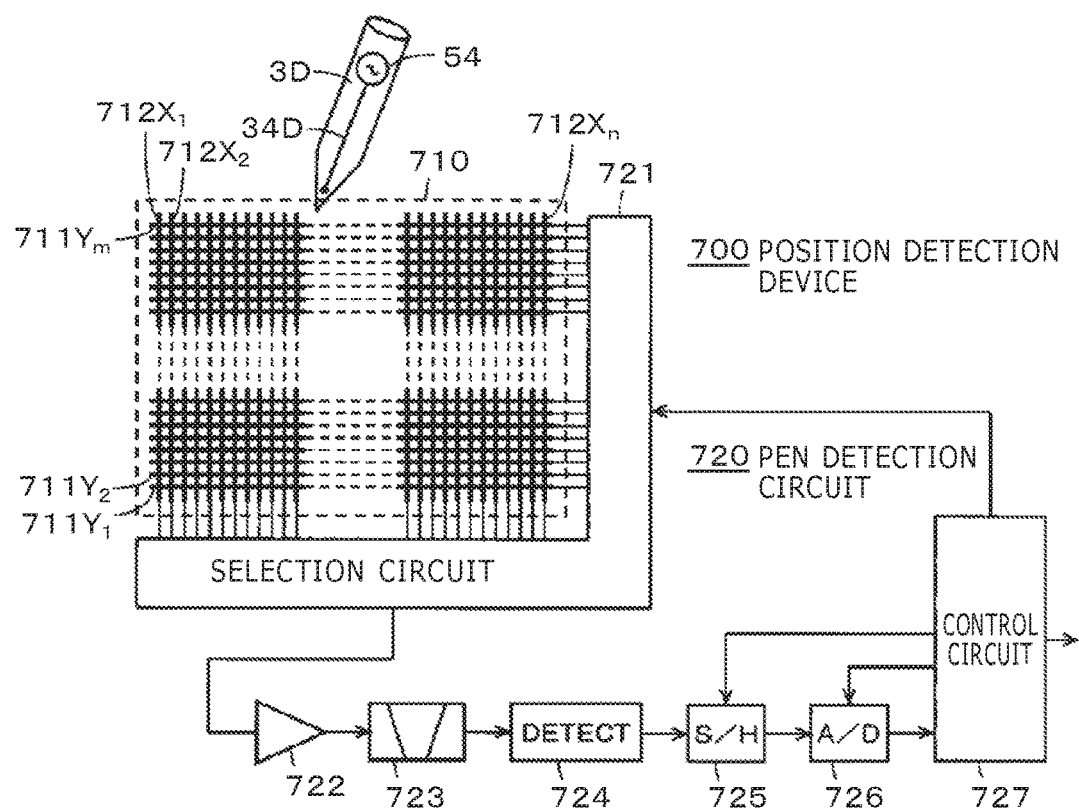
FIG. 11 is a view depicting a circuit configuration of a position detection device used together with the electronic pen according to the fourth embodiment of the present disclosure.
Figure 12:
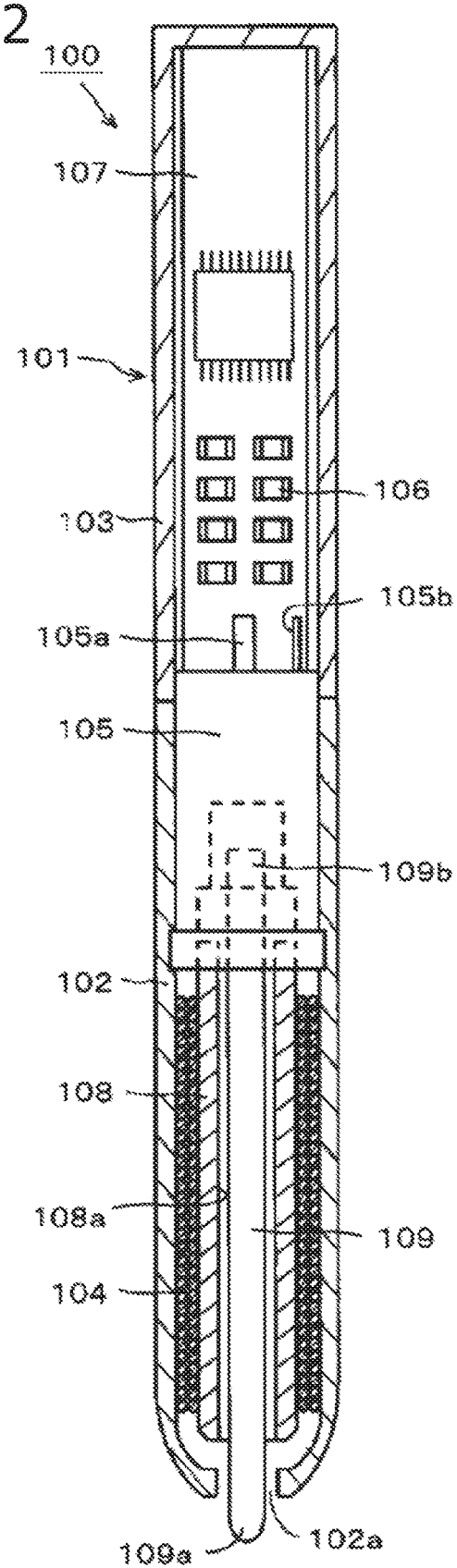
FIG. 12 is a view illustrating an example of a conventional electronic pen.

FIG. 11 is a block diagram illustrating a position detection device 700 which receives a signal from a capacitive type stylus pen 3D which is an example of the electronic pen of the fourth embodiment to detect a position on a sensor and detect a writing pressure.

As depicted in FIG. 11, the position detection device 700 of the present embodiment includes a sensor 710 and a pen detection circuit 720 connected to the sensor 710. The sensor 710 in the present example is formed, although a sectional view is omitted, from a first conductor group 711, an insulating layer (not depicted), and a second conductor group 712 layered in order from the lower layer side. The first conductor group 711 is formed, for example, from a plurality of first conductors $711Y_1, 711Y_2, \ldots,$ and $711Y_m$ (m is an integer greater than 1) extending in a horizontal direction (X-axis direction) and disposed in the Y-axis direction in parallel to each other and in a spaced relationship from each other by a predetermined distance.

Meanwhile, the second conductor group 712 is formed from a plurality of second conductors $712X_1, 712X_2, \ldots,$ and $712X_n$ (n is an integer greater than 1) extending in a direction crossing with, in the present example, in a vertical direction (Y-axis direction) orthogonal to, the extending direction of the first conductors $711Y_1, 711Y_2, \ldots,$ and $711Y_m$ and disposed in the X-axis direction in parallel to each other and in a spaced relationship from each other by a predetermined distance.

In this manner, the sensor 710 of the position detection device 700 has a configuration for detecting a position indicated by the capacitive type stylus pen 3D using a sensor pattern formed from the first conductor group 711 and the second conductor group 712 crossing with each other.

It is to be noted that, in the following description, where there is no necessity to distinguish the first conductors $711Y_1, 711Y_2, \ldots,$ and $711Y_m$ from one another, each of the conductors is referred to as first conductor 711Y. Similarly, where there is no necessity to distinguish the second conductors $712X_1, 712X_2, \ldots,$ and $712X_n$ from one another, each of the conductors is referred to as second conductor 712X.

The pen detection circuit 720 includes a selection circuit 721 which serves as an input/output interface to the sensor 710, an amplification circuit 722, a band-pass filter 723, a detection circuit 724, a sample and hold circuit 725, an AD conversion circuit 726, and a control circuit 727.

The selection circuit 721 selects one of the conductors 711Y or 712X from within the first conductor group 711 and the second conductor group 712 on the basis of a control signal from the control circuit 727. The conductor selected by the selection circuit 721 is connected to the amplification circuit 722, and a signal from the capacitive type stylus pen 3D is detected by the selected conductor and amplified by the amplification circuit 722. An output of the amplification circuit 722 is supplied to the band-pass filter 723, by which only a component of a frequency of the signal transmitted from the capacitive type stylus pen 3D is extracted.

An output signal of the band-pass filter 723 is detected by the detection circuit 724. An output signal of the detection circuit 724 is supplied to the sample and hold circuit 725, by which it is sampled and held at a predetermined timing with a sampling signal from the control circuit 727, and the sampled and held signal is converted into a digital value by the AD conversion circuit 726. The digital data from the AD conversion circuit 726 is read and processed by the control circuit 727.

The control circuit 727 operates in accordance with a program stored in an internal read-only memory (ROM) such that it sends out control signals individually to the sample and hold circuit 725, the AD conversion circuit 726, and the selection circuit 721. Then, the control circuit 727 calculates a position coordinate on the sensor 710 indicated by the capacitive type stylus pen 3D and detects a writing pressure detected by the writing pressure detector 35D from the digital data from the AD conversion circuit 726.

In particular, the control circuit 727 first supplies, for example, a selection signal for successively selecting the second conductors $712X_1$ to $712X_n$ to the selection circuit 721 and reads data outputted from the AD conversion circuit 726 upon selection of each of the second conductors $712X_1$ to $712X_n$ as a signal level. Then, if the signal level of all of the second conductors $712X_1$ to $712X_n$ does not reach a predetermined value, then the control circuit 727 decides that the capacitive type stylus pen 3D does not exist on the sensor 710 and repeats the control for successively selecting the second conductors $712X_1$ to $712X_n$.

If a signal of a level equal to or higher than a predetermined value is detected from any one of the second conductors $712X_1$ to $712X_n$ then the control circuit 727 stores the number of the second conductor 712X from which the highest signal level is detected and the numbers of a plurality of second conductors 712X around the second conductor 712X. Then, the control circuit 727 controls the selection circuit 721 to successively select the first conductors $711Y_1$ to $711Y_m$ to read out a signal level from the AD conversion circuit 726. At this time, the control circuit 727 stores the number of the first conductor 711Y from which the highest signal level is detected and the numbers of a plurality of first conductors 711Y around the first conductor 711Y.

Then, the control circuit 727 detects the position on the sensor 710 indicated by the capacitive type stylus pen 3D from the number of the second conductor 712X and the number of the first conductor 711Y from which the highest signal levels are detected and the numbers of a plurality of second conductors 712X and a plurality of first conductors 711Y around the second conductor 712X and the first conductor 711Y.

Further, the control circuit 727 detects a frequency of the signal from the AD conversion circuit 726 and then detects a writing pressure value detected by the writing pressure detector 35D from the detected frequency. In particular, the oscillation frequency of the oscillation circuit 54 of the capacitive type stylus pen 3D is a frequency according to the capacitance of the variable capacitor configured from the writing pressure detector 35D as described hereinabove. The control circuit 727 includes, for example, information of an association table between oscillation frequencies of the oscillation circuit 54 of the capacitive type stylus pen 3D and writing pressure values and detects a writing pressure value from within the information of the association table.

It is to be noted that, while, in the fourth embodiment described hereinabove, the capacitive type stylus pen 3D converts a writing pressure detected by the writing pressure detector 35D into a frequency and supplies the frequency to the electrode core 34D, the signal attribute to be associated with a writing pressure is not limited to the frequency, but a writing pressure may be associated with a phase of a signal, an intermittence frequency of a signal or the like.

Other Embodiments or Modifications

While, in the embodiments described hereinabove, the writing pressure detector uses a variable capacitor whose capacitance varies in response to a writing pressure, it is a matter of course that the writing pressure detector may be any variation element whose inductance value or resistance value is variable if the variation element varies the resonance frequency of the resonance circuit.

Further, while, in the embodiments described hereinabove, the writing pressure detector is provided on the electronic pen main body, the electronic pen main body may otherwise be configured such that it includes, in place of the writing pressure detector, a switch which is switched on in response to a pressure applied to the core body of the electronic pen main body such that, when the switch is switched on, the resonance circuit is rendered operative or the oscillation circuit starts oscillation. Alternatively, the electronic pen main body may be configured such that a threshold value is provided for the pressure to be detected by the writing pressure detector such that, when the pressure detected by the writing pressure detector exceeds the threshold value, the resonance circuit is rendered operative or the oscillation circuit starts oscillation.

Further, while, in the embodiments described hereinabove, the electronic pen main body is formed in an equal size with the replacement core of a commercially available ballpoint pen such that compatibility between the housings of the electronic pens 1 and 1M and the housing of the commercially available ballpoint pen can be established, it is a matter of course that it is possible to configure an electronic pen main body of a reduced thickness without taking the compatibility with the replacement core of the commercially available ballpoint pen into consideration.

Further, while, in the first embodiment described hereinabove, the electronic pen main body is configured for movement into and out of the housing through knocking using a knock cam mechanism, the electronic pen is not limited to that of such a knock type as just described but may be an electronic pen of a form in which the electronic pen main body is accommodated simply in the housing.

On the other hand, while, in the second embodiment described hereinabove, the electronic pen 1M is configured taking the compatibility not only of the electronic pen main body but also of the housing and the knock cam mechanism with a commercially available knock type multicolored ballpoint pen into consideration, the compatibility with a commercially available knock type multicolored ballpoint pen is not an indispensable constituent feature of the present disclosure similarly as in the first embodiment.

Further, while, in the electronic pen main bodies 3, 3B, and 3A of the first to third embodiments described hereinabove, information of a writing pressure detected by the writing pressure detector 35 or 35A is transmitted as a variation of the resonance frequency of the resonance circuit formed from the coil 31 or 31A and a capacitor to the position detection device, it is not limited to information of a writing pressure. For example, an inclination detected by an inclination detection sensor for detecting an inclination of the electronic pen main body with respect to the sensor face (indication inputting face) may be transmitted as a variation of the resonance frequency.

Similarly, while, in the fourth embodiment described hereinabove, the capacitive type stylus pen 3D sends out an AC signal of a frequency according to a writing pressure detected by the writing pressure detector 35D through the electrode core 34D, it may otherwise send out an AC signal of a frequency according to an inclination detected by an inclination detection sensor for detecting an inclination of the capacitive type stylus pen 3D with respect to the indication inputting face through the electrode core 34D.

Description of Reference Symbols 1, 1M . . . Electronic pen, 2, 2M . . . Housing, 3, 3B, 3A, 3D . . . Electronic pen main body, 4 . . . Knock cam mechanism, 6 . . . Replacement core of commercially available ballpoint pen, 31, 31A, 31D . . . Coil, 32, 32A, 32D . . . Ferrite core, 33 . . . Tubular body portion, 34, 34A, 34D . . . Core body, 35, 35A, 35D . . . Writing pressure detector, 32a . . . Coil wound portion, 32b . . . First coil non-wound portion, 32c . . . Second coil non-wound portion

The invention claimed is:

1. An electronic pen main body accommodated in a tubular housing of an electronic pen such that at least a pen tip of the electronic pen is projectable from an opening in an axial direction of the tubular housing, the electronic pen main body comprising:
a core body having an end in the axial direction of the housing that serves as the pen tip; and
a magnetic core having a coil wound thereon,
wherein the magnetic core has a coil non-wound portion in an axial direction of the magnetic core on which the coil is not wound, provided at least at a pen tip side thereof, and
wherein, in operation, the end of the core body that serves as the pen tip projects from the opening of the housing to outside of the housing, and part of the coil non-wound portion of the magnetic core projects from opening of the housing to outside of the housing, and
wherein the coil non-wound portion of the magnetic core has a diameter that is smaller than a diameter of the opening of the housing, and a diameter of a portion at which the coil is wound including a portion of the coil is greater than the diameter of the opening of the housing.

2. The electronic pen main body according to claim 1, wherein a tapered portion having a gradually tapered shape is formed at the pen tip side of the coil non-wound portion of the magnetic core.

3. The electronic pen main body according to claim 1, wherein a capacitor which configures a resonance circuit together with the coil is connected to the coil.

4. The electronic pen main body according to claim 3, wherein:
the core body is formed from a conductive material,
the electronic pen main body further comprises:
a signal generation circuit which is electrically connected to the core body and which, in operation, generates a signal that is sent out from the core body to outside of the housing; and
a power supply circuit which, in operation, supplies a power supply voltage to the signal generation circuit, and the resonance circuit charges power into a power storage device of the power supply circuit with energy obtained from outside of the housing by electromagnetic induction.

5. The electronic pen main body according to claim 4, wherein the power storage device is configured from an electric double layer capacitor.

6. The electronic pen main body according to claim 1, wherein the core body is formed from a nonconductive material.

7. The electronic pen main body according to claim 1, wherein:
the magnetic core has a through-hole provided therein that extends in the axial direction of the magnetic core,
the core body includes a core body main body portion which is inserted, at an end that is opposite to the end of the core body that serves as the pen tip, in the through-hole of the magnetic core, and
the electronic pen main body further comprises a writing pressure detector which is provided at the end of the core body that is opposite to the end that serves as the pen tip in the axial direction of the magnetic core and is fitted at the end of the core body that is opposite to the end that serves as the pen tip to the core body main body portion inserted through the through-hole of the magnetic core and which, in operation, detects an external force applied to the pen tip.

8. An electronic pen comprising:
at least one electronic pen main body; and
a tubular housing which has an opening provided at one end in an axial direction of the housing which is a pen tip side and is closed at another end thereof and in which the at least one electronic pen main body is accommodated,
wherein the at least one electronic pen main body includes:
a core body having an end in the axial direction of the housing that serves as a pen tip; and
a magnetic core having a coil wound thereon, and
wherein, in operation, the end of the core body that serves as the pen tip projects from the opening of the housing to outside of the housing, and part of the magnetic core projects from the opening of the housing to the outside of the housing, and
wherein the coil non-wound portion of the magnetic core has a diameter that is smaller than a diameter of the opening of the housing, and a diameter of a portion at which the coil is wound including a portion of the coil is greater than the diameter of the opening of the housing.

9. The electronic pen according to claim 8, wherein the end of the core body that serves as the pen tip and the part of the magnetic core have a diameter equal to or smaller than a diameter of a pen tip portion of a replacement core of a ballpoint pen and the at least one electronic pen main body has a length substantially equal to a length of the replacement core of the ballpoint pen.

10. The electronic pen according to claim 8, wherein the housing accommodates the replacement core of the ballpoint pen therein, and the electronic pen, in operation, performs a writing function of the ballpoint pen.

11. The electronic pen according to claim 8, wherein a knock type ballpoint pen mechanism which, in operation, causes the pen tip and the part of the magnetic core to project from the opening of the housing to the outside of the housing is provided in the housing, or a replacement core of a ballpoint pen is provided in the housing.

12. The electronic pen according to claim 8, wherein a knock type multicolored ballpoint pen mechanism which accommodates a plurality of electronic pen main bodies therein and, in operation, selectively causes one of the electronic pen main bodies to project, at the end of the core body that serves as the pen tip, to outside of the housing through the opening in the housing is provided in the housing.

13. The electronic pen according to claim 12, wherein the end of the core body that serves as the pen tip of each of the electronic pen main bodies and the part of the magnetic core have a diameter equal to or smaller than a diameter of a pen tip portion of a replacement core of a ballpoint pen and the electronic pen main body has a length substantially equal to a length of the replacement core of the ballpoint pen.

14. The electronic pen according to claim 13, wherein the housing accommodates the replacement core of the ballpoint pen in place of at least one of the electronic pen main bodies.

15. The electronic pen according to claim 12, wherein a control circuit which, in operation, stores identification information of the electronic pen main bodies and transmits the stored identification information to a position detection device is provided in a tubular body portion of the electronic pen main body.

16. The electronic pen according to claim 15, wherein a diameter of a coil wound portion of the electronic pen main body and a diameter of the tubular body portion are substantially equal to each other.

\* \* \* \* \*